United States Patent
Chung et al.

(10) Patent No.: US 11,646,917 B1
(45) Date of Patent: May 9, 2023

(54) MULTI-MODE NON-LOOP UNROLLED DECISION-FEEDBACK EQUALIZER WITH FLEXIBLE CLOCK CONFIGURATION

(71) Applicant: QUALCOMM Incorporated, San Diego, CA (US)

(72) Inventors: Younwoong Chung, San Diego, CA (US); Yu Song, San Diego, CA (US); Minghsien Tsai, Irvine, CA (US); Zhi Zhu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/563,989

(22) Filed: Dec. 28, 2021

(51) Int. Cl.
  *H04L 25/03* (2006.01)
  *H04L 7/00* (2006.01)
  *H04L 7/04* (2006.01)

(52) U.S. Cl.
  CPC ...... *H04L 25/03057* (2013.01); *H04L 7/0079* (2013.01); *H04L 7/04* (2013.01)

(58) Field of Classification Search
  CPC .... H04L 25/03057; H04L 7/0079; H04L 7/04
  See application file for complete search history.

(56) References Cited

U.S. PATENT DOCUMENTS

| | | | | |
|---|---|---|---|---|
| 7,715,474 | B2* | 5/2010 | Park | H04L 25/03146 375/233 |
| 9,240,912 | B1* | 1/2016 | Giridharan | H03F 3/45659 |
| 11,356,304 | B1* | 6/2022 | Fortin | H04L 25/03949 |
| 2010/0329325 | A1* | 12/2010 | Mobin | H04L 25/03343 375/232 |
| 2014/0341268 | A1* | 11/2014 | Maheshwari | H04L 25/03146 375/233 |
| 2019/0007053 | A1* | 1/2019 | Hailu | H03M 9/00 |
| 2021/0266200 | A1* | 8/2021 | Yang | H04L 25/03057 |
| 2022/0271978 | A1* | 8/2022 | Monga | H03F 1/38 |

OTHER PUBLICATIONS

Smail A., et al., "A 8 Gbps 0.67mW 1 Tap Current Integrating DFE in 40nm CMOS", 2014 IEEE 57th International Midwest Symposium on Circuits and Systems (MWSCAS), Aug. 3-6, 2014, pp. 81-84, DOI: 10.1109/MWSCAS.2014.6908357.

Payne R., et al., "A 6.25-GB/s Binary Transceiver in 0.13-/spl mu/m CMOS for Serial Data Transmission Across High Loss Legacy Backplane Channels", in IEEE Journal of Solid-State Circuits, vol. 40, No. 12, 13 Pages, Dec. 2005, DOI: 10.1109/JSSC.2005.856583.

* cited by examiner

*Primary Examiner* — Dac V Ha
(74) *Attorney, Agent, or Firm* — Loza & Loza, LLP

(57) ABSTRACT

An equalizing circuit includes a first current summer that receives a data signal and a first plurality of feedback signals, a first multiplexer that selects a first sampling clock signal from a plurality of clock signals using a signal that indicates a mode of operation of the equalizing circuit, and a first slicer that samples the output of the first current summer in accordance with timing provided by the first sampling clock signal. The equalizing circuit can have a second current summer that receives the data signal and a second plurality of feedback signals, a second multiplexer that selects a second sampling clock signal from the plurality of clock signals using the signal that indicates the mode of operation of the equalizing circuit, and a second slicer that samples the output of the second current summer according to timing provided by the second sampling clock signal.

27 Claims, 15 Drawing Sheets

US 11,646,917 B1

MULTI-MODE NON-LOOP UNROLLED DECISION-FEEDBACK EQUALIZER WITH FLEXIBLE CLOCK CONFIGURATION

TECHNICAL FIELD

The present disclosure generally relates to a clock and data recovery circuits and, more particularly, to a decision-feedback equalizer with clock and data paths that are selected based on mode of operation.

BACKGROUND

Electronic device technologies have seen explosive growth over the past several years. For example, growth of cellular and wireless communication technologies has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. Wireless devices may include a high-speed bus interface for communication of signals between hardware components.

High-speed serial buses offer advantages over parallel communication links when, for example, there is demand for reduced power consumption and smaller footprints in integrated circuit (IC) devices. In a serial interface, data is converted from parallel words to a serial stream of bits using a serializer and is converted back to parallel words at the receiver using a deserializer. For example, the high-speed bus interface may be implemented using a Peripheral Component Interconnect Express (PCIe) bus, Universal Serial Bus (USB) or Serial Advanced Technology Attachment (SATA), among others.

IC devices may include a serializer/deserializer (SERDES) to transmit and receive through a serial communication link. In high-speed applications, timing of the operation of a SERDES may be controlled by one or more clock signals. Data rates supported or available on a serial data link may be limited by interference, noise, reflections and other characteristics of the communication channel provided by the serial data link. Performance, accuracy or reliability of the SERDES may depend on the availability of equalizing circuits that can reduce errors in received data due to channel imperfections. Conventional systems often use equalizers that occupy large areas within an IC device and can consume excessive power. Therefore, there is an ongoing need for new techniques that enable reliable data capture from high-speed serial links.

SUMMARY

Certain aspects of the disclosure relate to systems, apparatus, methods and techniques that can be used in equalizing circuits in a receiver coupled to a serial data link. Certain aspects provide flexible configuration of equalizing circuits to enable different modes of operation. The modes of operation can include high frequency, high data rate operation and low-power modes that can be configured through control of clock signals used to sample data from the serial data link.

In various aspects of the disclosure, an equalizing circuit includes a first current summer configured to receive a data signal and a first plurality of feedback signals, a first multiplexer configured to select a first sampling clock signal from a plurality of clock signals using a signal that indicates a mode of operation of the equalizing circuit, and a first slicer configured to sample the output of the first current summer in accordance with timing provided by the first sampling clock signal.

In various aspects of the disclosure, an apparatus includes means for combining a data signal with feedback signals, including a first current summer and a first plurality of feedback signals; means for selecting sampling signals, including a first multiplexer configured to select a first sampling clock signal from a plurality of clock signals using a signal that indicates a mode of operation of the equalizing circuit; and means for sampling the data signal including a first slicer configured to sample the output of the first current summer in accordance with timing provided by the first sampling clock signal.

In various aspects of the disclosure, a method for equalizing a data signal received from a serial data link includes configuring first current summer to combine the data signal and a first plurality of feedback signals, configuring a first multiplexer to select a first sampling clock signal from a plurality of clock signals, the first sampling clock signal being associated with an equalizing mode, and configuring a first slicer to sample the output of the first current summer in accordance with timing provided by the first sampling clock signal.

In certain aspects, the plurality of clock signals may include one or more phase versions of a receive clock signal. At least one of the one or more phase versions of the receive clock signal may be inverted. The plurality of clock signals may include quadrature and in-phase versions of the receive clock signal. The plurality of clock signals may include the receive clock signal and an auxiliary clock signal that has a preconfigured phase shift with respect to the receive clock signal.

In certain aspects, the first plurality of feedback signals includes a signal generated using an output of the first slicer. The first plurality of feedback signals may include a signal generated by an eye opening monitor. The first plurality of feedback signals may include an offset signal configured to calibrate the equalizing circuit.

In certain aspects, the equalizing circuit has a second current summer configured to receive the data signal and a second plurality of feedback signals, a second multiplexer configured to select a second sampling clock signal from the plurality of clock signals using the signal that indicates the mode of operation of the equalizing circuit, and a second slicer configured to sample the output of the second current summer in accordance with timing provided by the second sampling clock signal. Each of a plurality of clock inputs of the second multiplexer is coupled to a signal that is an inverse of a clock signal coupled to a corresponding clock input of the first multiplexer such that the second sampling clock signal is inverted with respect to the first sampling clock signal. In some instances, the first plurality of feedback signals includes a signal generated using an output of the second slicer and the second plurality of feedback signals includes a signal generated using an output of the first slicer.

DETAILED DESCRIPTION

Figure 1:
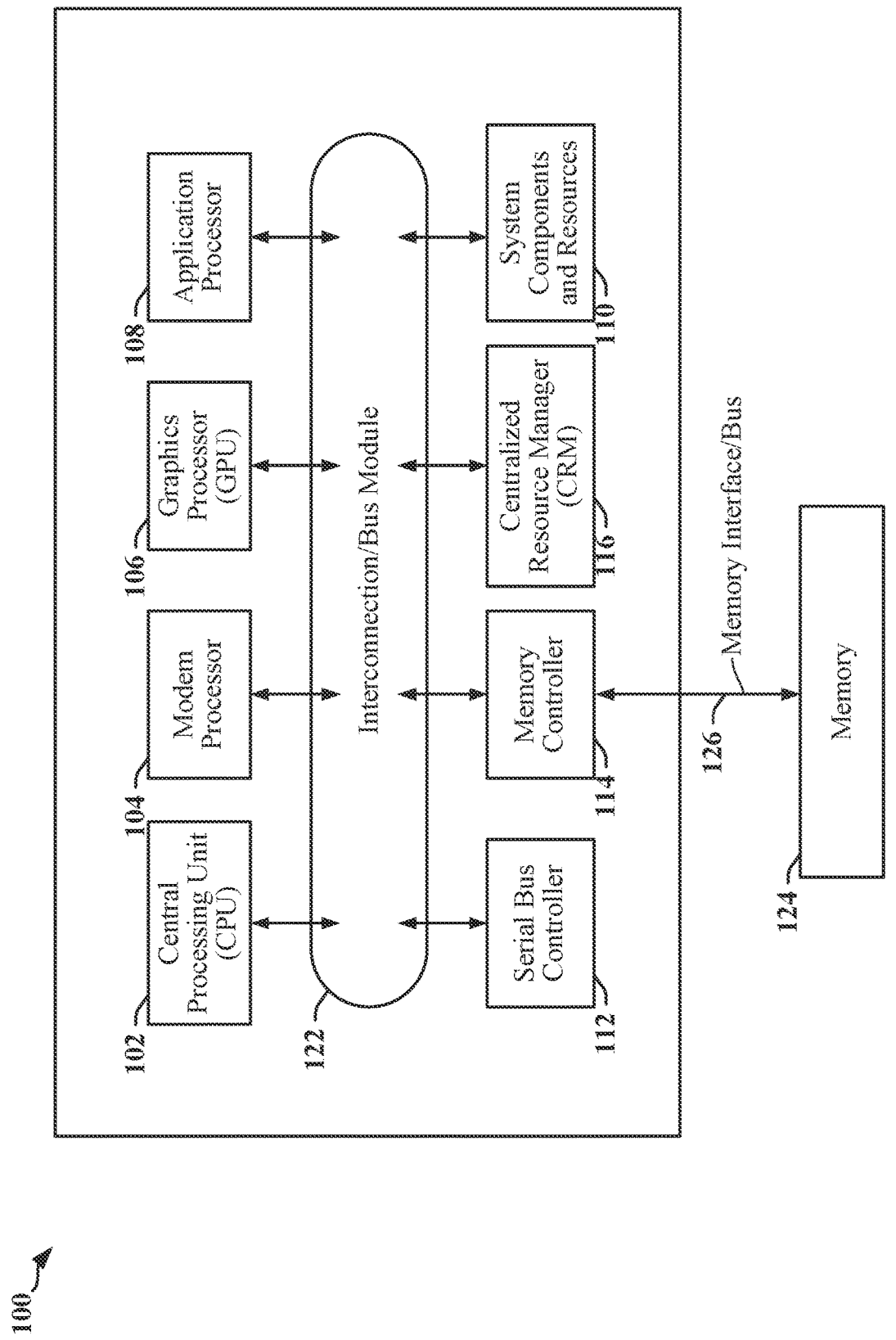
FIG. 1 illustrates an example of a system-on-a-chip (SOC) in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

With reference now to the Figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

The terms "computing device" and "mobile device" are used interchangeably herein to refer to any one or all of servers, personal computers, smartphones, cellular telephones, tablet computers, laptop computers, netbooks, ultrabooks, palm-top computers, personal data assistants (PDAs), wireless electronic mail receivers, multimedia Internet-enabled cellular telephones, Global Positioning System (GPS) receivers, wireless gaming controllers, and similar personal electronic devices which include a programmable processor. While the various aspects are particularly useful in mobile devices (e.g., smartphones, laptop computers, etc.), which have limited resources (e.g., processing power, battery, size, etc.), the aspects are generally useful in any computing device that may benefit from improved processor performance and reduced energy consumption.

The term "multicore processor" is used herein to refer to a single integrated circuit (IC) chip or chip package that contains two or more independent processing units or cores (e.g., CPU cores, etc.) configured to read and execute program instructions. The term "multiprocessor" is used herein to refer to a system or device that includes two or more processing units configured to read and execute program instructions.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors (DSPs), modem processors, video processors, etc.), memory blocks (e.g., read only memory (ROM), random access memory (RAM), flash, etc.), and resources (e.g., timers, voltage regulators, oscillators, etc.), any or all of which may be included in one or more cores.

Memory technologies described herein may be suitable for storing instructions, programs, control signals, and/or data for use in or by a computer or other digital electronic device. Any references to terminology and/or technical details related to an individual type of memory, interface, standard, or memory technology are for illustrative purposes only, and not intended to limit the scope of the claims to a particular memory system or technology unless specifically recited in the claim language. Mobile computing device architectures have grown in complexity, and now commonly include multiple processor cores, SoCs, co-processors, functional modules including dedicated processors (e.g., communication modem chips, OPS receivers, etc.), complex memory systems, intricate electrical interconnections (e.g., buses and/or fabrics), and numerous other resources that execute complex and power intensive software applications (e.g., video streaming applications, etc.).

Process technology employed to manufacture semiconductor devices, including IC devices is continually improving. Process technology includes the manufacturing methods used to make IC devices and defines transistor size, operating voltages and switching speeds. Features that are constituent elements of circuits in an IC device may be referred as technology nodes and/or process nodes. The terms technology node, process node, process technology may be used to characterize a specific semiconductor manufacturing process and corresponding design rules. Faster and more power-efficient technology nodes are being continuously developed through the use of smaller feature size to produce smaller transistors that enable the manufacture of higher-density ICs.

FIG. 1 illustrates example components and interconnections in a system-on-chip (SoC) 100 that may be suitable for implementing certain aspects of the present disclosure. The SoC 100 may include a number of heterogeneous processors, such as a central processing unit (CPU) 102, a modem processor 104, a graphics processor 106, and an application processor 108. Each processor 102, 104, 106, 108, may include one or more cores, and each processor/core may perform operations independent of the other processors/cores. The processors 102, 104, 106, 108 may be organized in close proximity to one another (e.g., on a single substrate, die, integrated chip, etc.) so that the processors may operate at a much higher frequency/clock rate than would be possible if the signals were to travel off-chip. The proximity of the cores may also allow for the sharing of on-chip memory and resources (e.g., voltage rails), as well as for more coordinated cooperation between cores.

The SoC 100 may include system components and resources 110 for managing sensor data, analog-to-digital conversions, and/or wireless data transmissions, and for performing other specialized operations (e.g., decoding high-definition video, video processing, etc.). System components and resources 110 may also include components such as voltage regulators, oscillators, phase-locked loops (PLLs), peripheral bridges, data controllers, system controllers, access ports, timers, and/or other similar components used to support the processors and software clients running on the computing device. The system components and resources 110 may also include circuitry for interfacing with peripheral devices, such as cameras, electronic displays, wireless communication devices, external memory chips, etc.

The SoC 100 may further include a Universal Serial Bus (USB) or other serial bus controller 112, one or more memory controllers 114, and a centralized resource manager (CRM) 116. The SoC 100 may also include an input/output module (not illustrated) for communicating with resources external to the SoC, each of which may be shared by two or more of the internal SoC components.

The processors 102, 104, 106, 108 may be interconnected to the USB controller 112, the memory controller 114, system components and resources 110, CRM 116, and/or other system components via an interconnection/bus module 122, which may include an array of reconfigurable logic gates and/or implement a bus architecture. Communications may also be provided by advanced interconnects, such as high performance networks on chip (NoCs).

The interconnection/bus module 122 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. In some cases, the interconnection/bus module 122 may implement an arbitration scheme to prevent multiple master components from attempting to drive the bus simultaneously. The memory controller 114 may be a specialized hardware module configured to manage the flow of data to and from a memory 124 via a memory interface/bus 126.

The memory controller 114 may comprise one or more processors configured to perform read and write operations with the memory 124. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In certain aspects, the memory 124 may be part of the SoC 100.

Figure 2:
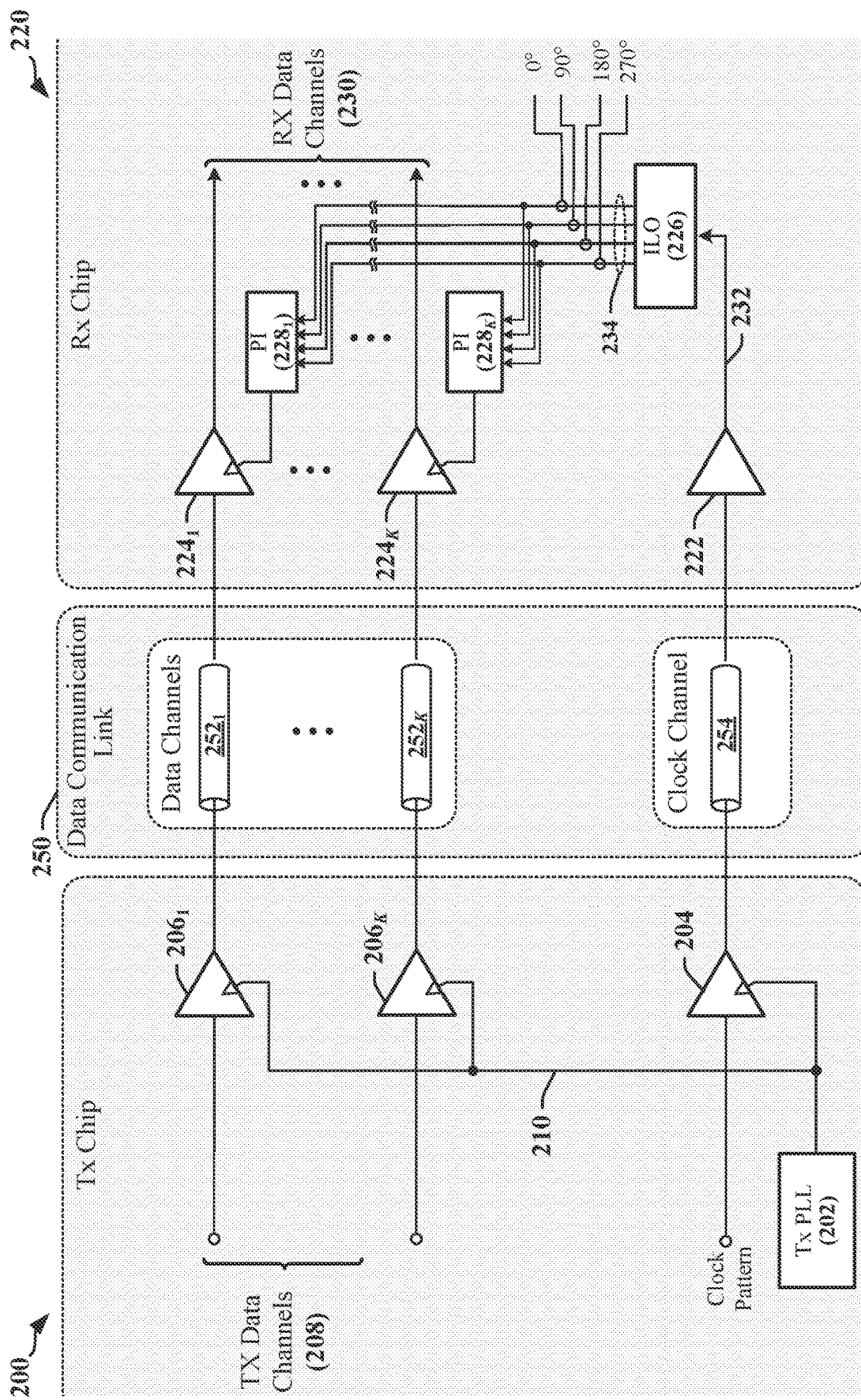
FIG. 2 illustrates an example of a system that employs a multi-channel data communication link.

FIG. 2 illustrates an example of a system that employs a multi-channel data communication link 250 to couple a transmitting device 200 with a receiving device 220. The data communication link 250 includes multiple channels $252_1$-$252_K$, 254 that provide a transmission medium through which signals propagate from a first device to a second device. In the illustrated example, the transmitting device 200 can be configured to transmit data signals over one or more data channels $252_1$-$252_K$ in accordance with timing information provided by a clock signal transmitted over a clock channel 254. The transmitting device 200 may include serializers (not shown) configured to convert parallel data into serial data for transmission over the data channels $252_1$-$252_K$. The transmitting device 200 further includes data drivers $206_1$-$206_K$ configured to generate data signals over the one or more data channels $252_1$-$252_K$ to the receiving device 220 through the data communication link 250.

In some examples, the transmitting device 200 includes a clock driver 204 that generates the clock signal forwarded over the clock channel 254. In other examples, the clock channel 254 is omitted and the receiving device 220 is equipped with clock recovery circuits that can recover timing information from signals transmitted over one or more of the data channels $252_1$-$252_K$ in order to generate receive clock signals. Clock forwarding is common in communication systems, and provides the benefit that a phase locked loop (PLL) and other clock recovery circuits are not required in the receiving device 220. Typically, only one phase of the transmitter-generated clock signal is forwarded when clock forwarding is used. Limiting the number of clock signals can conserve power and the space that would be occupied by additional clock channels.

The receiving device 220 may be configured to receive and process the data signals. The receiving device 220 may generate additional phases of the received or recovered clock signal to obtain in-phase and quadrature (11Q) versions of the clock signal to be used by phase interpolators $228_1$-$228_K$. A quadrature signal has phase that is shifted by 90° with respect to an in-phase signal. The phase interpolators $228_1$-$228_K$ may provide outputs that are phase-adjusted or phase-corrected I/Q versions of the clock signal. In one example, the outputs of each of the phase interpolators $228_1$-$228_K$ are provided to sampling circuits $224_1$-$224_K$.

Clock generation circuits in the receiving device 220 may include oscillators, which are fundamental building blocks of modern electronics. Oscillators are often implemented as ring oscillators (ROs), which can offer advantages over other types of oscillator including reduced area footprint, power efficiency and scalability with technological process. In the illustrated example, the clock generation circuits in the receiving device 220 includes an injection-locked oscillator (ILO 226) that receives a clock signal 232 from a line receiver 222 coupled to the clock channel 254 and generates phase-shifted versions 234 of the clock signal 232, including I/Q versions of the clock signal 232.

In high-speed applications, data throughput of a serial data link may be limited by the characteristics of the channel used to carry data signals. Impedance mismatches, parasitic electromagnetic coupling and other factors can cause signal distortion. In many implementations, equalization circuits and capabilities are included in input/output (I/O) circuits to compensate for signal distortions attributable to inter-symbol interference (ISI) and other effects that can combine to limit bandwidth in a channel. ISI can result when a first-received symbol interferes with subsequently received symbols due to reflections, frequency-dependent delays and other imperfections in the channel. A symbol may refer to signaling state within a unit interval (UI), or symbol interval, in which data is modulated or encoded in the waveform of a transmitted signal. A decision-feedback equalizer (DFE) may be implemented in the receiver. The DFE is a nonlinear equalizer that is used in high-loss channels. The DFE can be configured to flatten channel response and limit signal distortion without introducing noise or crosstalk that can occur with equalizers that operate using amplification of received signals.

Figure 3:
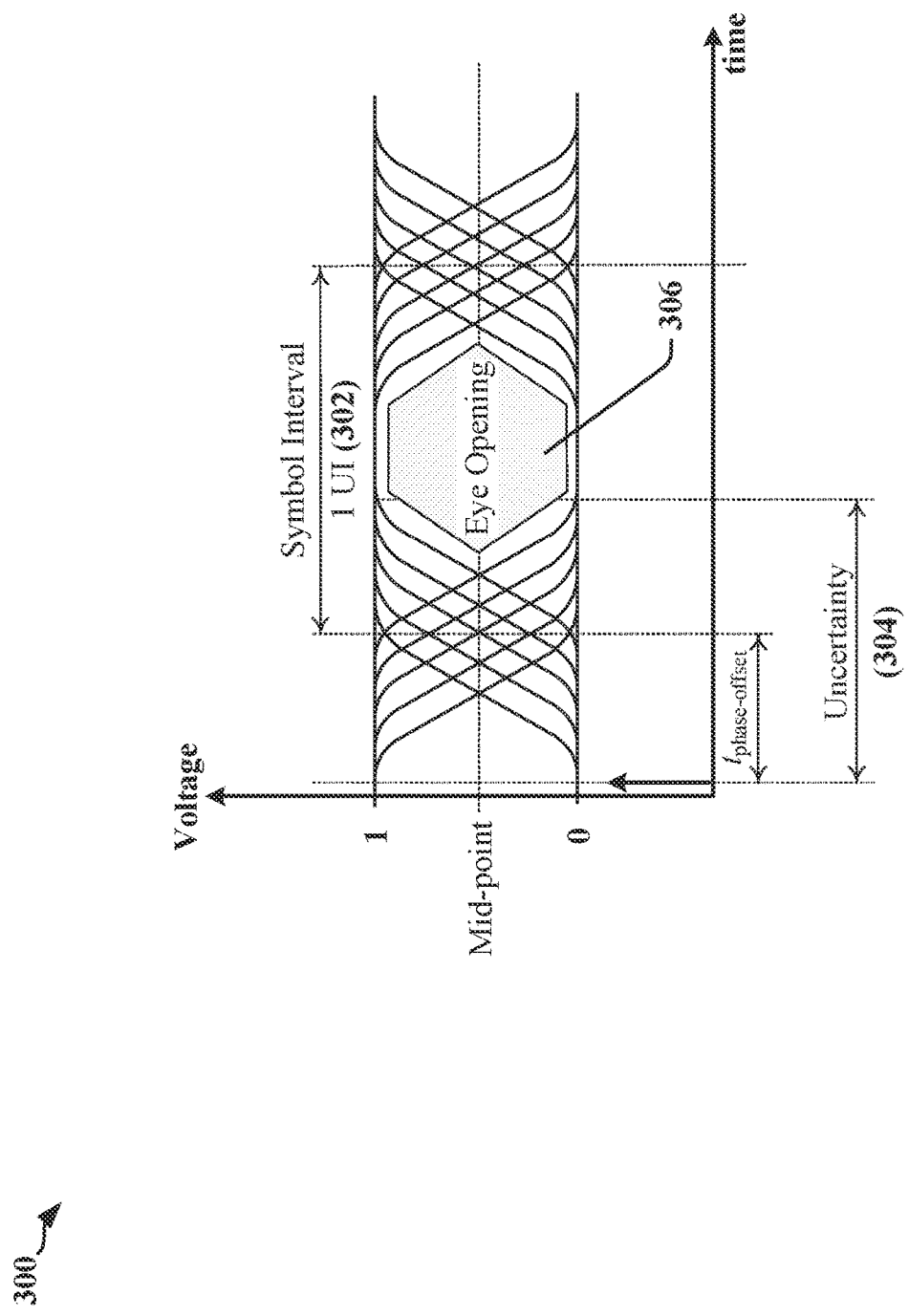
FIG. 3 illustrates transition regions and eye regions in an eye-pattern

FIG. 3 illustrates an eye diagram 300 generated as an overlay of multiple symbol intervals, including a single symbol interval 302. A signal transition region 304 represents a time period of uncertainty at the boundary between two symbols where variable signal rise times prevent reliable decoding. State information may be determined reliably in a region defined by an eye opening 306 that represents the time period in which the symbol is stable and can be reliably received and decoded. The eye opening 306 may define a region in which mid-point crossings do not occur and a receiver or decoder can reliably sample, demodulate or decode information from a data signal in the symbol interval 302. The eye opening 306 may be narrowed along the time axis by increases in data rate and may be compressed in the voltage axis by ISI and other types of interference and distortion.

The concept of periodic sampling and display of the signal is useful during design, adaptation and configuration of systems which use a clock and data recovery (CDR) circuit that re-creates the received data-timing signal using frequent transitions appearing in the received data. A communication system based on Serializer/Deserializer (SERDES) technology is an example of a system where an eye opening 306 in an eye diagram 300 can be utilized as a basis for judging the ability to reliably recover data. An eye-opening monitor (EOM) may be implemented using one or more comparators that can indicate when the voltage in a channel is sufficiently higher or lower than the mid-point voltage to enable reliable sampling of the signal carried by the channel.

Figure 4:
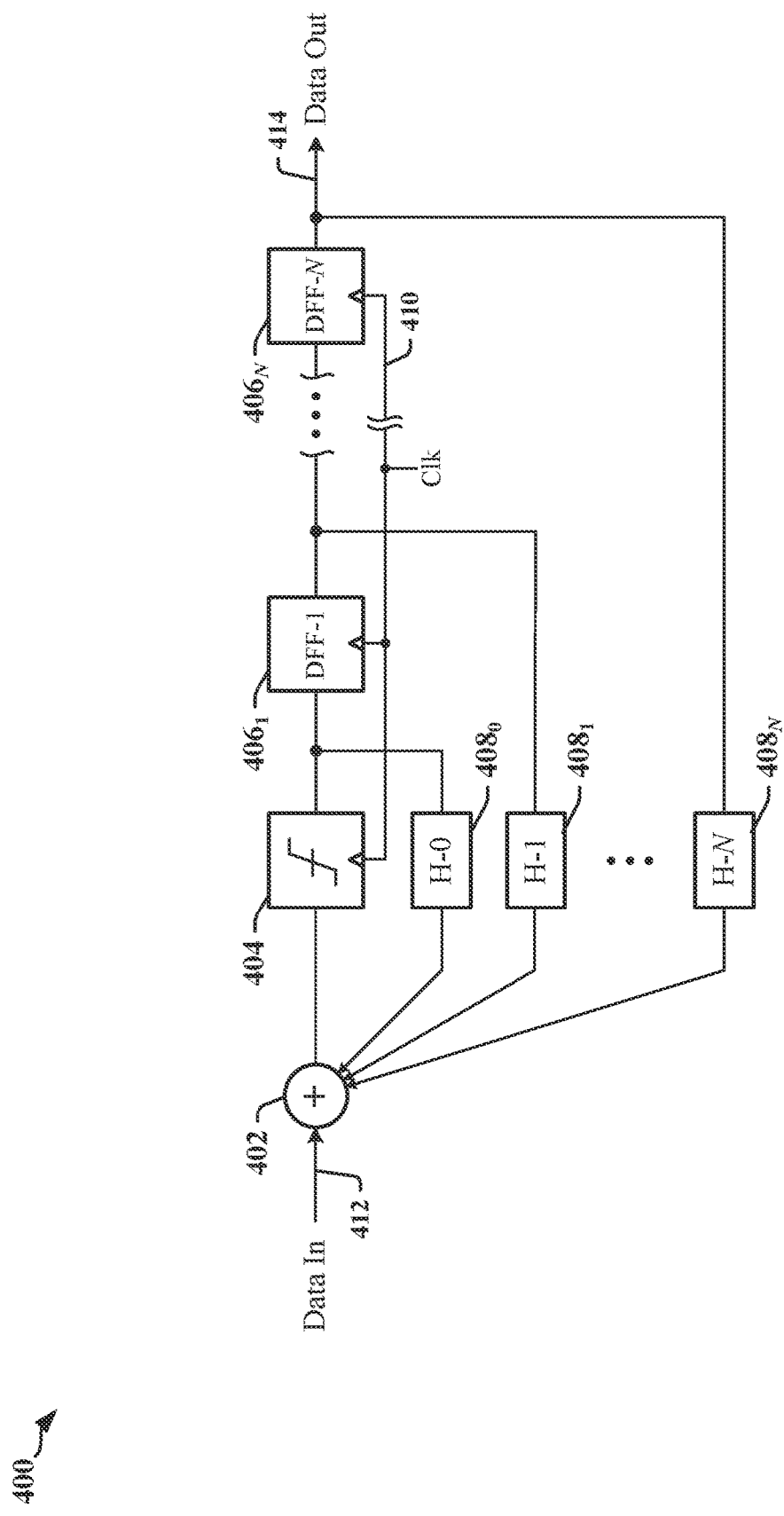
FIG. 4 illustrates an example of a conventional multi-tap decision-feedback equalizer.

FIG. 4 illustrates an example of a conventional multi-tap DFE 400. A slicer 404 may be implemented using a flipflop or latch to sample a data signal 412 received as an input from the serial bus. An output of the slicer 404 may be configured to drive a delay line. The delay line may include a number (N) of D-flipflops (D-FFs $406_1$-$406_N$) clocked by a receive clock signal 410. Weight values can be applied to the outputs of the slicer 404 and D-FFs $406_1$-$406_N$. In the illustrated example, configurable weighted tap coefficients $408_0$-$408_N$ are applied to the outputs of the slicer 404 and D-FFs $406_1$-$406_N$ in a feedback path that includes a current summer or adder 402 that adds the weighted prior decisions to the data signal 412. Magnitudes and polarities of the weighted tap coefficients $408_0$-$408_N$ can be configured, calibrated or adjusted to compensate for channel characteristics. The multi-tap DFE 400 can be configured to cancel ISI attributable to previous bits received in the data signal 412, enabling later-received bits to be sampled or detected by the slicer 404 with reduced bit error rate (BER). In some instances, the configuration, calibration or adjustment of the weighted tap coefficients $408_0$-$408_N$ can be performed by a controller using an adaptive algorithm. In some instances, the weighted tap coefficients $408_0$-$408_N$ can be preconfigured by a designer or application.

In some implementations, the efficacy of the multi-tap DFE 400 can be improved by increasing the number of taps available for ISI cancellation. However, the increased number of flipflops, latches and feedback circuits requires increased allocation of silicon real estate and can increase power consumption.

The ever-increasing demand for higher data rates can limit the effectiveness of DFEs. For example, clock rates may increase to an extent that the detection, capture and computation of DFE compensation settings cannot be reliably completed within the time available for sampling each bit of received data. In some instances, an open-loop DFE, referred to as an "unrolled DFE," may be used where DFE computations can be performed using speculative or potential values for data. In some examples, the first feedback tap may be implemented indirectly. In one example, the output of the slicer 404 is generated without feedback provided through the first tap. In another example, the output of the slicer 404 is generated using an estimate of feedback that substitutes for the feedback provided through the first tap.

Figure 5:
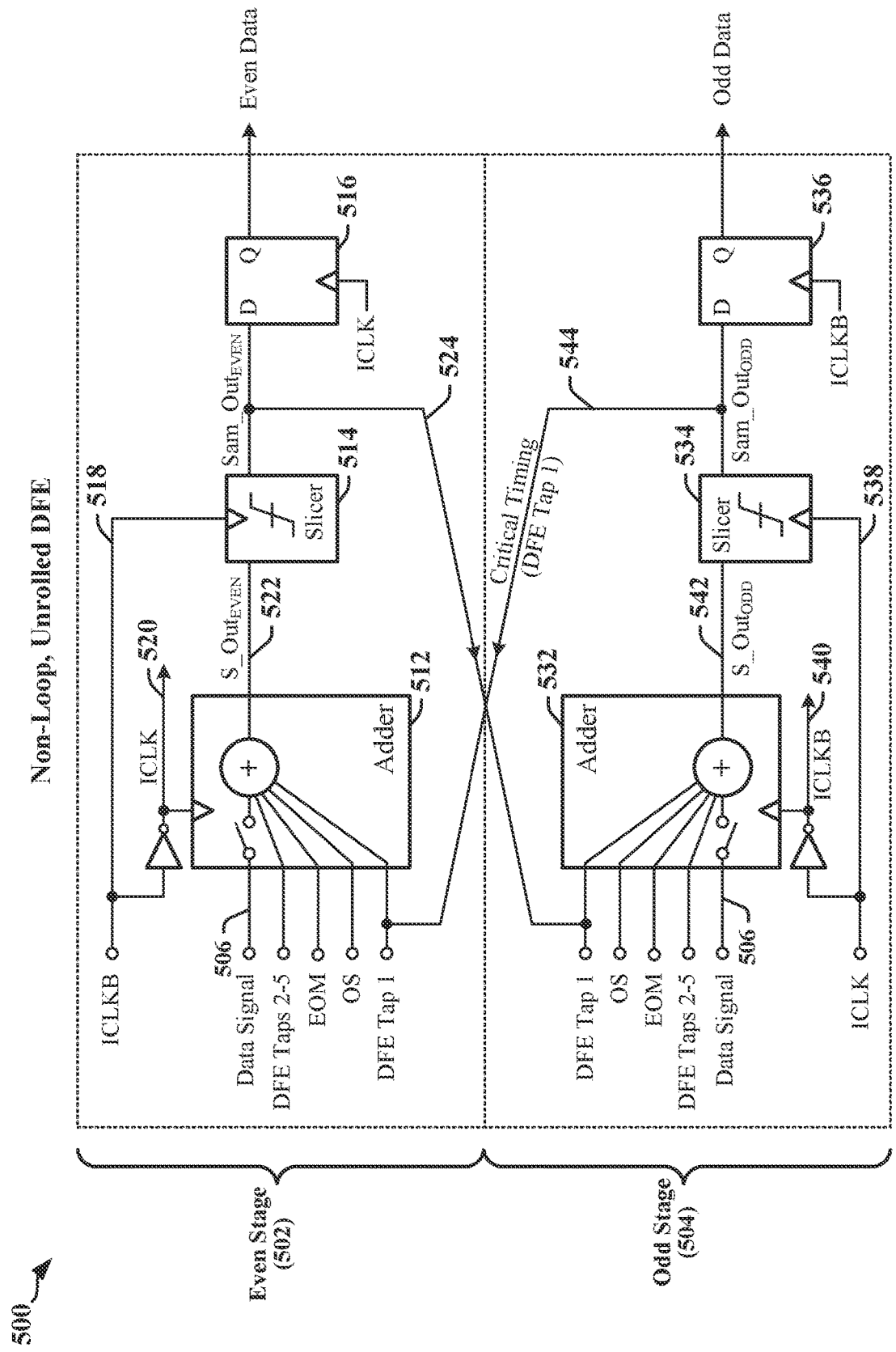
FIG. 5 illustrates a first example of a non-loop, unrolled decision-feedback equalizer.

FIG. 5 illustrates an example of a non-loop, unrolled DFE 500, which may also be referred to as a Direct Feedback/Speculative DFE. The non-loop, unrolled DFE 500 includes an even DFE stage 502 and an odd DFE stage 504 configured to capture alternate symbols or data elements from a data signal 506 received from a serial bus. For example, in a sequence of three consecutive UIs, the even DFE stage 502 may be configured to capture data within the first and third UI while the odd DFE stage 504 may be configured to capture data in the second UI.

The even DFE stage 502 includes a current summer or adder 512 that adds feedback and control inputs to the data signal 506 prior to data capture by a slicer 514. The feedback and control inputs include DFE taps, eye-opening monitor (EOM) control signal and one or more preconfigured offsets (OS). In the illustrated example, a total of 5 DFE taps are provided. The first DFE tap is a weighted version of the output of a slicer 534 in the odd DFE stage 504 and corresponds to the value sampled in the immediately preceding UI. The operation of the even DFE stage 502 relies on the first DFE tap input being available and stable within the time provided in a single UI. The output 524 of the slicer 514 in the even DFE stage 502 is captured by a flipflop 516. In the illustrated example, the slicer 514 is clocked by an inverse receive clock signal (ICLKB 518). ICLKB 518 is inverted to obtain a version of the receive clock signal (ICLK 520) that is used to control, trigger or otherwise clock the adder 512 and the flipflop 516 to enable sufficient setup time at respective inputs.

The odd DFE stage 504 includes a current summer or adder 532 that adds feedback and control inputs to the data signal 506 and provides an output 542 that is sampled by a slicer 534. The feedback and control inputs include DFE taps, eye-opening monitor (EOM) control signal and one or more preconfigured offsets (OS). In the illustrated example, a total of 5 DFE taps are provided. The first DFE tap is a weighted version of the output of a slicer 514 in the even DFE stage 502 and corresponds to the value sampled in the immediately preceding UI. The operation of the odd DFE stage 504 relies on the first DFE tap input being available and stable within the time provided in a single UI. The output 544 of the slicer 534 in the odd DFE stage 504 is captured by a flipflop 536. In the illustrated example, the slicer 534 is clocked by an in-phase receive clock signal (ICLK 538). ICLK 538 is inverted to obtain a version of the receive clock signal (ICLKB 540) that is used to control, trigger or otherwise clock the adder 532 and the flipflop 536 to enable sufficient setup time at respective inputs.

In the illustrated example, the ICLKB 518 used by the even DFE stage 502 may be the inverse of the ICLK 538 used by the odd DFE stage 504. The even DFE stage 502 may obtain a version of the receive clock signal (ICLK 520) by inverting the ICLKB 518. The odd DFE stage 504 may obtain a version of the inverted receive clock signal (ICLKB 540) by inverting the ICLK 538.

Figure 6:
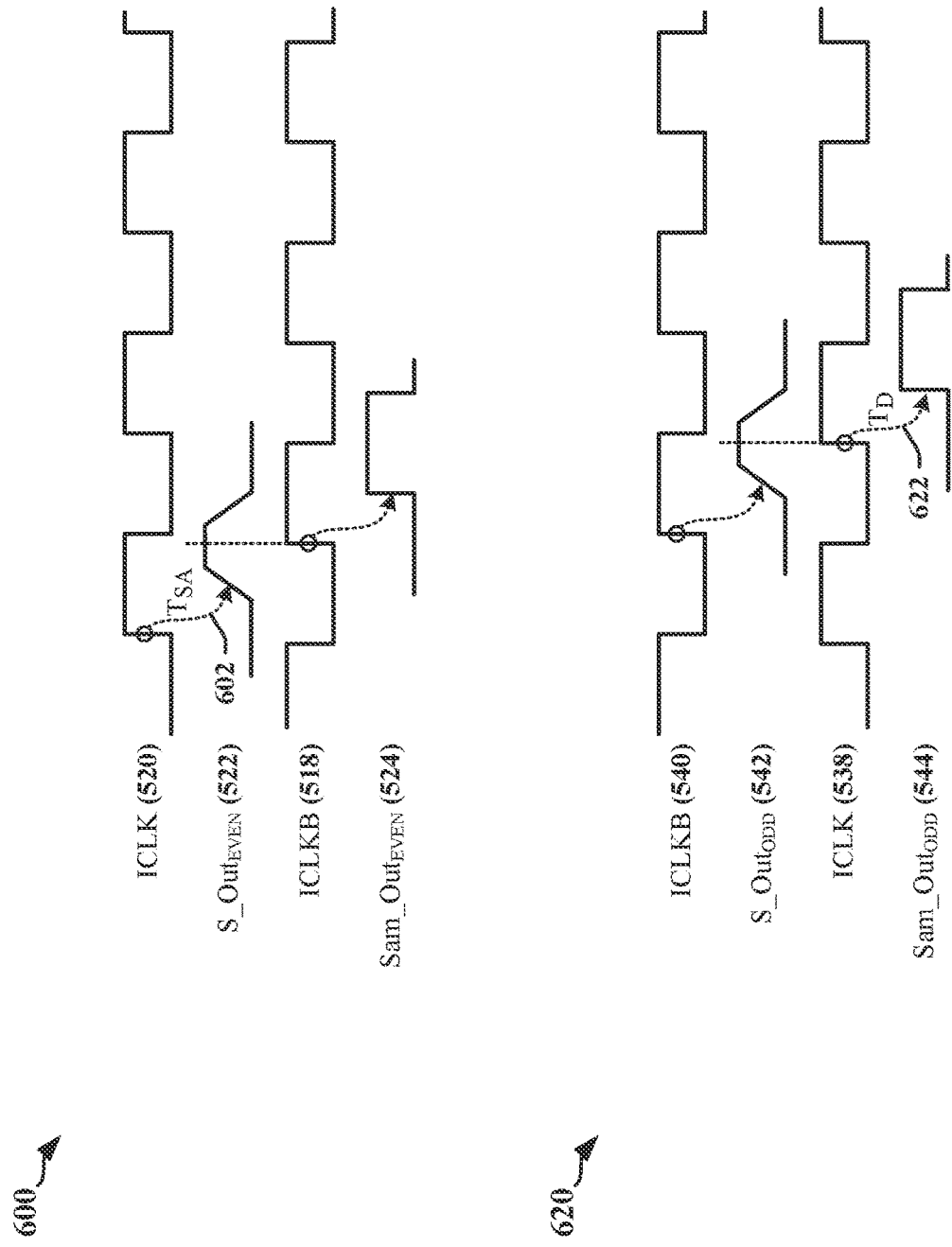
FIG. 6 illustrates certain aspects of the operation of the decision-feedback equalizer illustrated in FIG. 5.

FIG. 6 illustrates certain aspects of the operation of the even DFE stage 502 and the odd DFE stage 504 illustrated in FIG. 5. For example, certain constraints on timing of the operation of the even DFE stage 502 is illustrated. In the first timing diagram 600, an adder sampling time 602 ($T_{SA}$) corresponds to the delay from a rising edge in ICLK 520 to a leading edge in the output (S_Out$_{EVEN}$ 522) of the adder 512 in the even DFE stage 502. In the second timing diagram 620, the delay 622 ($T_D$) corresponds to the transition time of the output (Sam_Out$_{ODD}$ 544) of the slicer 534 in the odd DFE stage 504 after the slicer 534 has been clocked. For reliable operation, $T_D < T_{SA}$ to ensure that feedback regarding the immediately preceding odd UI is included in the current even UI. In many implementations, the data rates that can be supported by the non-loop, unrolled DFE 500 are limited by the 1-tap feedback time, which includes the slicer delay.

Figure 7:
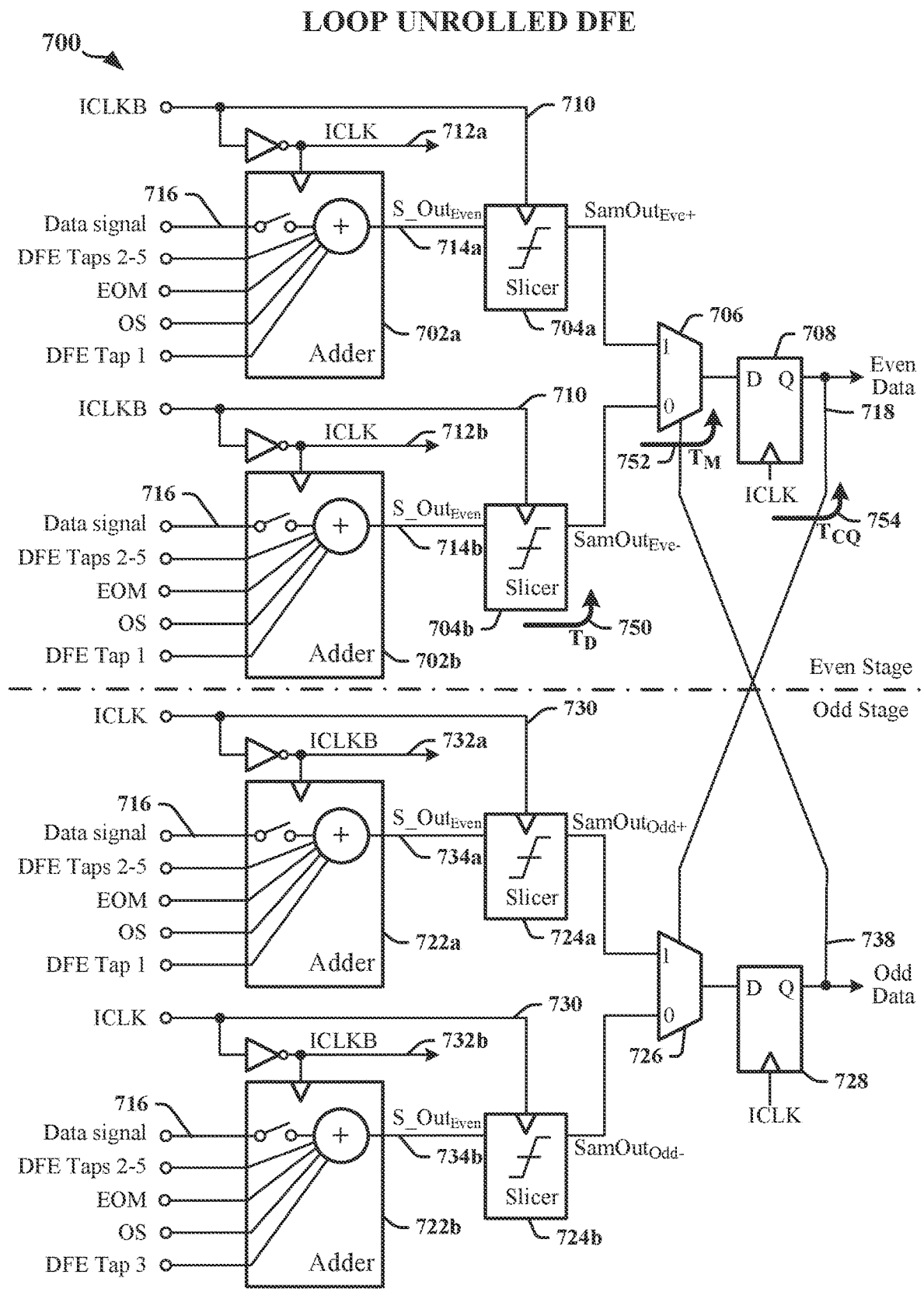
FIG. 7 illustrates a second example of an unrolled decision-feedback equalizer.

FIG. 7 illustrates an example of a loop unrolled DFE 700. The second example relates to an unrolled DFE that includes a control loop in a configuration that may be referred to herein as a loop unrolled DFE. The unrolled DFE 700 uses a first predicted compensation value to capture data when the current data bit resolves to a first binary value, and a second predicted compensation value to capture data when the current data bit resolves to a second, different binary value. The illustrated unrolled DFE 700 is configured with an adder and slicer combination for each predicted compensation value. The results obtained by each adder and slicer combination may be stored or otherwise retained until a DFE decision has been resolved and one of the stored results can be selected to include in the data output signal.

The unrolled DFE 700 includes an even DFE stage and an odd DFE stage, the DFE stages being configured to capture alternate symbols or data elements from a data signal 716 received from a serial bus. For example, in a sequence of three consecutive UIs, the even DFE stage may be configured to capture data within the first and third UI while the odd DFE stage may be configured to capture data in the second UI.

The even DFE stage is configured to produce a pair of results using first predicted compensation values for a current data bit that resolves to a value of '0' and second predicted compensation values for a current data bit that resolves to '1'. Current summers or adder 702a, 702b add respective feedback and control inputs to the data signal 716 and provide outputs 714a, 714b that are sampled by corresponding slicers 704a, 704b during data capture. The feedback and control inputs include DFE taps, EOM control signal and one or more preconfigured offsets (OS). In the illustrated example, a total of 5 DFE taps are provided. The first DFE tap may be a weighted version of the output of the odd DFE stage and may correspond to the value sampled in the immediately preceding UI. A multiplexer 706 provides an output by selecting between the outputs of the slicers 704a, 704b based on the odd result (odd data output 738) generated by the odd DFE stage. The output of the multiplexer 706 is captured by a flipflop 708 that provides the even result (even data output 718).

The odd DFE stage is configured to produce a pair of results using first predicted compensation values for a current data bit that resolves to a value of '0' and second predicted compensation values for a current data bit that resolves to '1', Current summers or adders 722a, 722b add respective feedback and control inputs to the data signal 716 and provide outputs 734a, 734b that are sampled by corresponding slicers by corresponding slicers 724a, 724b during data capture. The feedback and control inputs include DFE taps, EOM control signal and one or more preconfigured offsets (OS). In the illustrated example, a total of 5 DFE taps are provided. The first DFE tap may be a weighted version of the output of the odd DFE stage and may correspond to the value sampled in the immediately preceding UI. A multiplexer 726 provides an output by selecting between the outputs of the slicers 724a, 724b based on the even result (even data output 718) generated by the even DFE stage. The output of the multiplexer 726 is captured by a flipflop 728 that provides the odd result (odd data output 738).

In the illustrated example, the ICLKB signal 710 used by the even DFE stage may be an inverse of the ICLK signal 730 used by the odd DFE stage. The even DFE stage may obtain its ICLK signals 712a, 712b by inverting the ICLKB signal 710. The odd DFE stage may obtain its ICLKB signal 732a, 732b by inverting the ICLK signal 730.

In the example illustrated in FIG. 7, a first delay 750 ($T_D$) corresponds to the transition time of the output (Sam_Out$_{EVE\_}$) of slicer 704b in the even DFE stage, a second delay 752 ($T_M$) corresponds to the transition time through the multiplexer 706 in the even DFE stage and a third delay 754 ($T_{CQ}$) corresponds to the delay from a rising edge in the ICLK signal 712b to a leading edge in the even data output 718. For reliable operation:

$$T_D + T_M + T_{CQ} < 1\,UI.$$

The unrolled DFE 700 may support higher data rates than the non-loop, unrolled DFE 500 illustrated in FIG. 5, but can require much larger areas of an IC device and can significantly increase the power consumed by a receiver circuit coupled to a serial bus.

Certain aspects of this disclosure enable a receiver to support higher data rates without significant increases in power consumption and using limited areas of the host IC device. In accordance with certain aspects of the disclosure, multiple phase versions of the receive clock may be used to control timing of an unrolled DFE. Different phase versions of the receive clock may be referred to as "different phases" and the combination of the receive clock and the various phase versions may be referred to as a "multiphase clock" or "multiphase clock signal."

Figure 8:
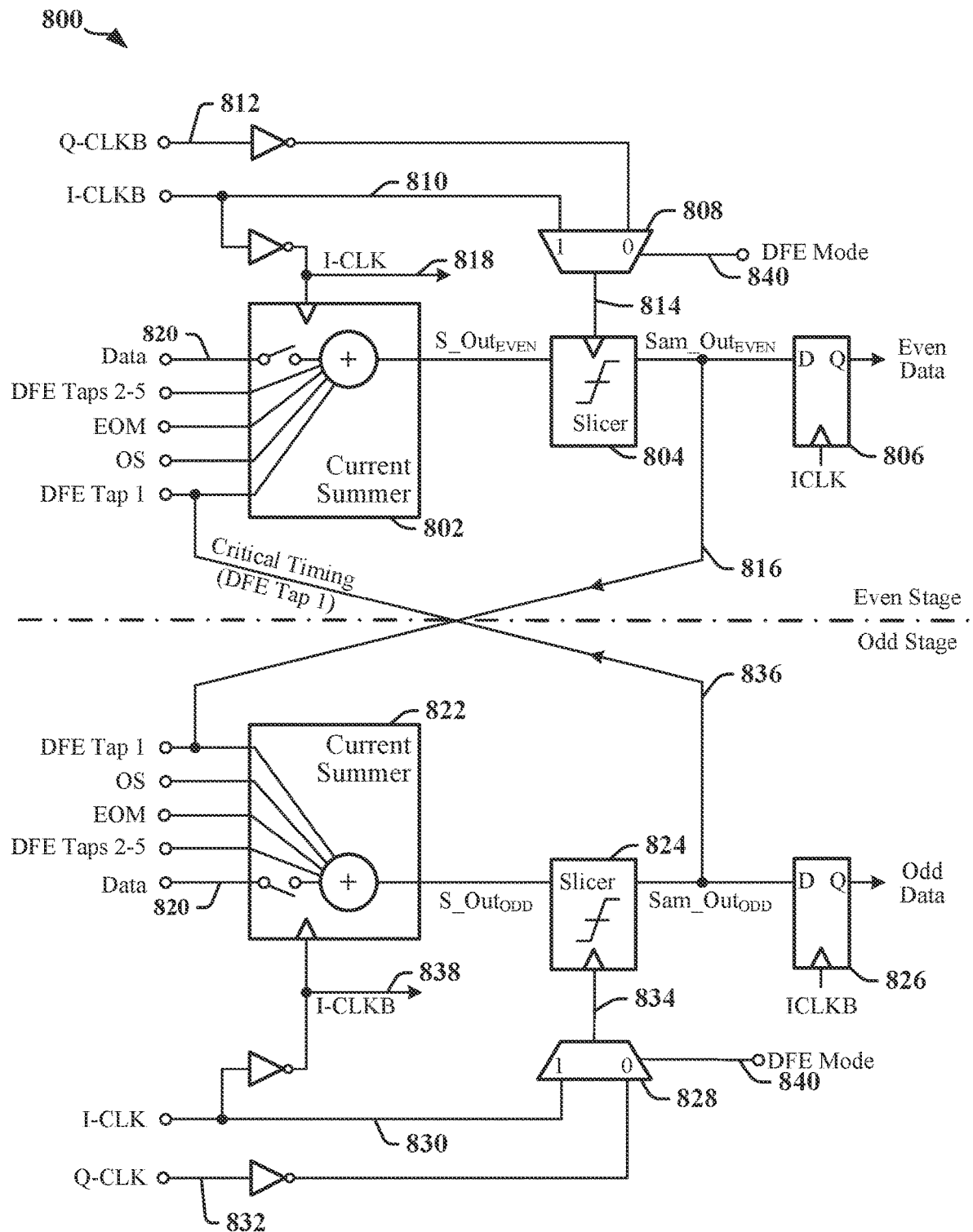
FIG. 8 illustrates an example of an unrolled decision-feedback equalizer that is configured in accordance with certain aspects of this disclosure.

FIG. 8 illustrates an example of a non-loop unrolled DFE 800 that is configured in accordance with certain aspects of this disclosure. The non-loop unrolled DFE 800 includes an even DFE stage and an odd DFE stage configured to capture alternate symbols or data elements from a data signal 820 received from a serial bus. For example, in a sequence of three consecutive UIs, the even DFE stage may be configured to capture data within the first and third UI while the odd DFE stage may be configured to capture data in the second UI.

The even DFE stage includes an adder or current summer 802 that adds feedback and control inputs to the data signal 820 prior to data capture by a slicer 804 in an Nth UI. The feedback and control inputs include DFE taps. EOM control signal and one or more preconfigured offsets (OS). In the illustrated example, a total of 5 DFE taps are provided. The first DFE tap is a weighted version of the output of a slicer 824 in the odd DFE stage and corresponds to the value sampled in the (N−1)th UI that immediately precedes the Nth UI. The operation of the even DFE stage relies on the first DFE tap input becoming available and stable within the time available in a single UI. The output of the slicer 804 in the even DFE stage is captured by a flipflop 806.

The odd DFE stage includes an adder or current summer 822 that adds feedback and control inputs to the data signal 820 prior to data capture by a slicer 824. The slicers 804 and 824 capture data in alternating UIs. For example, the slicer 824 in the odd DFE stage may be configured to capture data in the (N−1)th UI and (N+1)th UI while the slicer 804 in the even DFE stage is configured to capture data in the Nth UI. The feedback and control inputs include DFE taps. EOM control signal and one or more preconfigured offsets (OS). In the illustrated example, a total of 5 DFE taps are provided. The first DFE tap is a weighted version of the output of the slicer 804 in the even DFE stage and corresponds to the value sampled in the immediately preceding Nth UI. The operation of the odd DFE stage relies on the first DFE tap input being provided and stable within the time available in a single UI. The output of the slicer 824 in the odd DFE stage is captured by a flipflop 826.

According to one aspect of this disclosure, the slicers 804 and 824 are clocked by signals that can be configured or selected based on mode of operation, data rate, channel characteristics or another factor. The signals include multiple phase versions of a receive clock signal. The use of multi-phase receive clocks can provide additional time margins to allow timely propagation of feedback signals to the current summer in a DFE.

In the illustrated example, the even DFE stage receives a first clock signal (I-CLKB 810) that is the inverse of an in-phase version of the receive clock signal, and a second clock signal (Q-CLKB 812) that is an inverse version of a quadrature receive clock signal. An input of a first inverter is coupled to I-CLKB 810 and provides a clock signal 818 to the current summer 802. I-CLKB 810 is provided to a first input of a multiplexer 808 and a second inverter provides a clock signal 818 that is a delayed, version of the quadrature receive clock signal to a second input of the multiplexer 808. The multiplexer 808 is configured to provide a clock signal 814 to the slicer 804 in the even DFE stage by selecting between the inverse of I-CLKB 810 and the delayed version of the quadrature receive clock signal. The multiplexer 808 selects between its first input and second input in response to the signaling state of a DFE Mode select signal 840. The output of the slicer 804 is captured by a flipflop 806 that is clocked by the clock signal 818 that is provided to the current summer 802.

The odd DFE stage receives a third clock signal (I-CLK 830) that is an in-phase version of the receive clock signal, and a fourth clock signal (Q-CLK 832) that is a quadrature version of the receive clock signal. An input of a third inverter is coupled to I-CLK 830 and provides a clock signal 838 to the current summer 822. I-CLK 830 is provided to a first input of a multiplexer 828 and a fourth inverter provides a delayed inverse version of Q-CLK 832 to a second input of the multiplexer 828. The multiplexer 828 is configured to provide a clock signal 834 to the slicer 824 in the odd DFE stage by selecting between I-CLK 830 and the delayed inverse version of Q-CLK 832. The multiplexer 828 selects between its first input and second input in response to the signaling state of a DFE Mode select signal 840. The output of the slicer 824 is captured by a flipflop 826 that is clocked by the clock signal 838 that is provided to the current summer 822.

Quadrature versions of the receive clock signal may be used to close the timing between the triggering edge of the clock signal 814 or 834 provided to a slicer 804 or 824 and the triggering edge of the clock signal 818 or 838 provided to a corresponding current summer 802 or 822. In the illustrated example, the slicer 824 is clocked by a receive clock signal (I-CLK signal 838) that is the inverse of a receive clock signal (I-CLKB signal 840) used to control, trigger or otherwise clock the current summer 822 and the flipflop 826 to enable sufficient setup time at respective inputs. In the illustrated example, the I-CLKB signal 818 used by the even DFE stage may be a synchronized inverse of the I-CLK signal 838 used by the odd DFE stage. The even DFE stage may obtain its I-CLK signal 818 by inverting the I-CLKB signal 818. The odd DFE stage may obtain its I-CLKB signal 840 by inverting the I-CLK signal 838. The use of multiphase clock signals can increase the data rates supported by the non-loop unrolled DFE 800 with respect to conventional DFEs.

In certain examples, a data rate can be supported when:

$T_D < T_{SA} + 0.5 UI.$

In one example, $T_{SA}$ corresponds to the sampling time of the current summer 802 and $T_D$ corresponds to the delay from a rising edge in the clock signal 834 to the leading edge in the output 836 (Sam_Out$_{ODD}$) of the slicer 824 in the odd DFE stage. In another example, $T_{SA}$ corresponds to the sampling time of the current summer 822 and $T_D$ corresponds to the delay from a rising edge in the clock signal 814 to the leading edge in the output 816 (Sam_Out$_{EVEN}$) of the slicer 804 in the even DFE stage.

Figure 9:
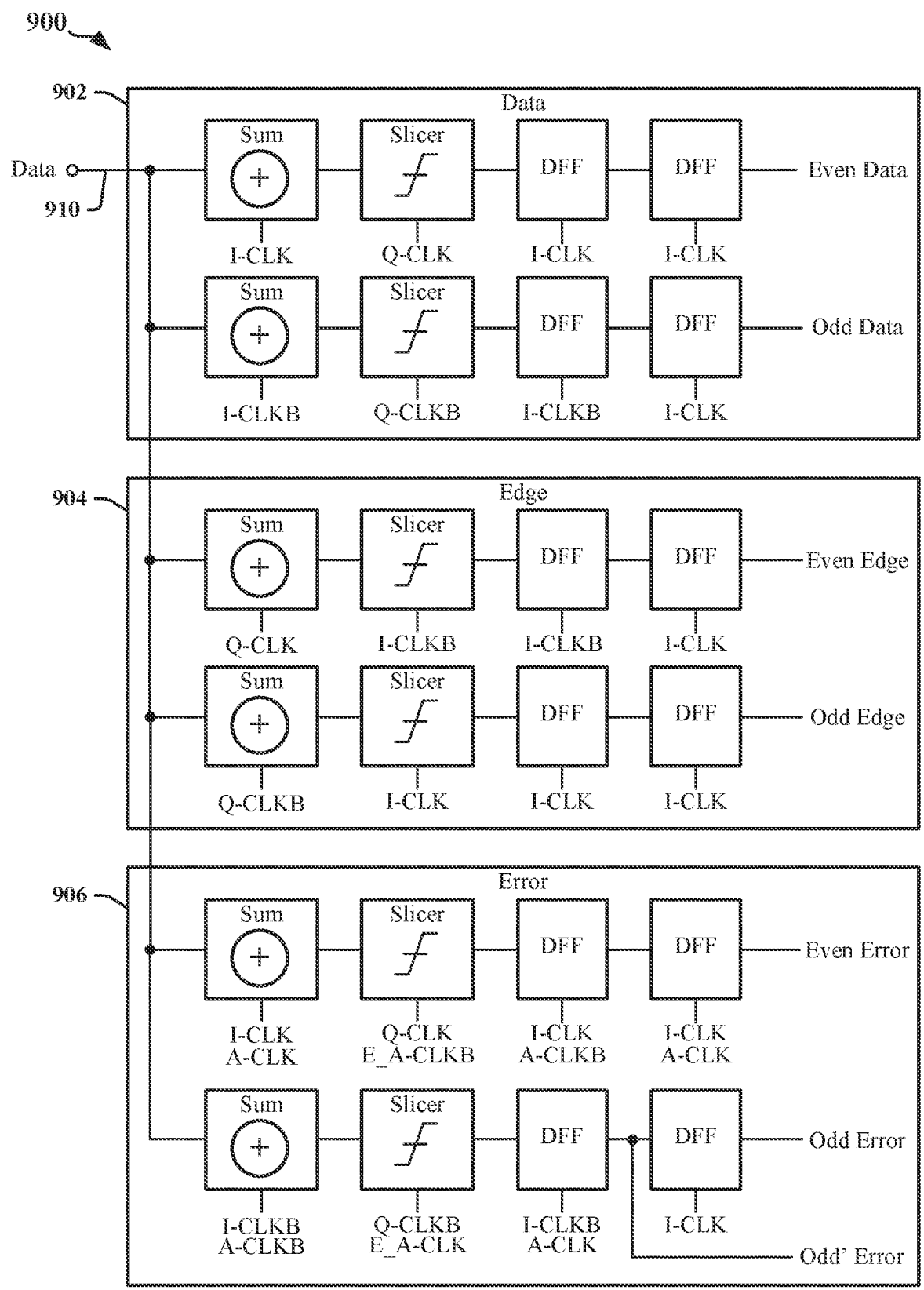
FIG. 9 illustrates a combination of decision-feedback equalizers that can be used to generate certain signals used for data and clock recovery in accordance with certain aspects of this disclosure.

FIG. 9 illustrates configurations of DFEs 900 that can be used in different modes of operation to generate certain signals used for data and clock recovery in accordance with certain aspects of this disclosure. A first DFE section 902 includes even and odd DFE stages configured to capture data from a data signal 910. The summers and flipflops in the first DFE section 902 are clocked by versions of the in-phase clock signal, while the slicer is clocked by versions of the quadrature clock signal.

A second DFE section 904 includes even and odd DFE stages configured to detect even and odd edges in the data signal 910. The summers in the second DFE section 904 are clocked by versions of the quadrature clock signal, while the slicer and flipflops is clocked by in-phase versions of the clock signal.

A third DFE section 906 includes even and odd DFE stages configured to detect errors arising from the DFE configuration. The even and odd DFE stages respond to the data signal 910 and, in a first mode, the summers and flipflops are clocked by versions of the in-phase clock signal, while the slicer is clocked by versions of the quadrature clock signal. In a second mode, the summers, the slicer and certain of the flipflops are clocked by versions of an auxiliary clock signal. In-phase and inverted in-phase versions of the auxiliary clock signal are available. The auxiliary clock signal may be provided to improve data rates in some receivers. The auxiliary clock signal may be phase shifted with respect to the receive clock and the phase shift may enable signals to be sampled at the earliest or optimal time with respect to edges in the receive clock signal. In some examples, the auxiliary clock signal may be produced by a phase interpolator circuit.

According to certain aspects of the disclosure, a clock-selectable auxiliary DFE path may be provided for DFE and EOM modes of operation. The auxiliary path may be enabled when DFE is disabled and equalization responds to eye-opening information. For example, one or more comparators may indicate when voltage levels of a wire in a serial data link exceeds a high-level eye demarcation threshold or is less than a low-level eye demarcation threshold. The demarcation thresholds may be configured to ensure that data can be reliably detected and decoded from the serial data link in the presence of interference or noise.

According to certain aspects of the disclosure, the auxiliary DFE path may be used for DFE adaptation (DFE-ADAP mode) when data is being received at high data rates and when DFE stages are configured to use a combination of in-phase and quadrature receive clock signals. The auxiliary DFE path may be used for EOM modes, for DFE forcing modes and for non-DFE modes that use in-phase and inverted in-phase receive clock signals without quadrature receive clock signals. In some EOM modes of operation, the auxiliary DFE path may be operates as an eye opening monitor to measure the horizontal eye width. In one example, the horizontal eye width may be ascertained by sweeping the phase of an auxiliary clock in the auxiliary DFE path from 0 to 360 degrees while measuring the difference between the maximum low voltage signaling state and the minimum high voltage signaling state.

A non-loop unrolled DFE configured in accordance with certain aspects of the disclosure can provide a fast feedback time and can provide low power operating modes. In one example, higher data rates may be enabled using a multiphase (I/Q) receive clock. In another example, the quadrature clock signals can be suppressed or disabled and in-phase versions of the receive clock used, enabling the receiver to operate at lower power levels. The selectable data path can enable dynamic selection of DFE and Non-DFE modes to accommodate application requirements and changing application needs.

Figure 10:
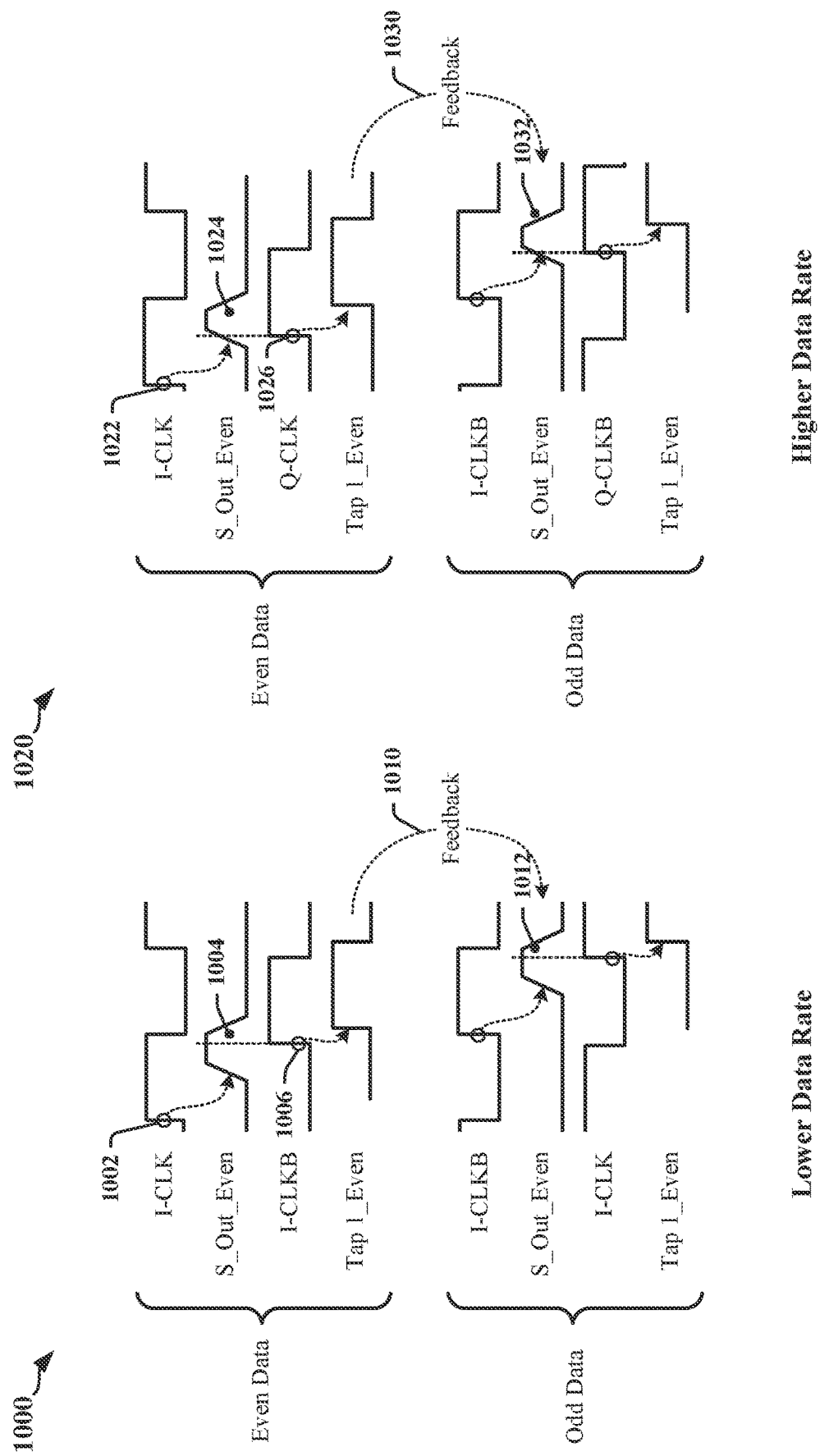
FIG. 10 illustrates certain aspects of the timing associated with low-power, lower data rate modes and with higher data rate modes that may consume increased power.

FIG. 10 illustrates certain aspects of the timing associated with low-power, lower data rate modes and with higher data rate modes that may consume increased power. In a lower data rate mode 1000, DFE operations are timed in accordance with in-phase and inverted in-phase versions of the receive clock. In the illustrated example, the current summer in the even DFE stage samples the received data signal at a rising edge 1002 of the in-phase receive clock. The current summer in the even DFE stage adds the feedback signals and provides an output 1004 that is captured by the slicer at the rising edge 1006 of the inverted in-phase receive clock. The output of the slicer is weighted and provided as feedback 1010 to the current summer in the odd DFE stage. The feedback 1010 contributes to the output 1012 of the current summer in the odd DFE stage.

In a higher data rate mode 1020, DFE operations are timed in accordance with in-phase and quadrature versions of the receive clock signal or in accordance with versions of the receive clock signal and an auxiliary clock signal. The auxiliary clock signal may be configured under EOM control. In the illustrated example, the current summer in the even DFE stage samples the received data signal at a rising edge 1022 of the in-phase receive clock. The current summer in the even DFE stage adds the feedback signals and provides an output 1024 that is captured by the slicer at the rising edge 1026 of the quadrature version of the receive clock. The output of the slicer is weighted and provided as feedback 1030 to the current summer in the even DFE stage. The feedback 1030 contributes to the output 1032 of the current summer in the even DFE stage.

The difference in timing corresponds to the delay between the in-phase and quadrature versions of the receive clock. The difference may be quantified as a quarter-cycle of the receive clock. Two data bits or symbols are captured in each cycle of the receive clock and the difference may be stated as 2UI×0.25=0.5UI.

A non-loop unrolled DFE configured in accordance with certain aspects of the disclosure may include current summers that receive multiple types of feedback. The current summers may provide inputs for multiple DFE taps, offset calibration signals and signals provided by an EOM comparator. A high-gain current summer can be used to decrease feedback time at the sampler stage.

A receiver that employs DFEs configured in accordance with certain aspects of tis disclosure can operate in a number of different modes. Table 1 summarizes certain modes of operation of the unrolled DFEs disclosed herein.

TABLE 1

| | EOM mode | | | Non-EOM mode | | |
|---|---|---|---|---|---|---|
| | DFE-ADAP | DFE-FORCE | Non-DFE | DFE-ADAP | DFE-FORCE | Non-DFE |
| DATA | N/A | I/Q | I | I/Q | I/Q | I |
| AUX | N/A | A | A | I/Q | X | X |
| Power (PI + Summer + SA) | N/A | 3X | 2X | 2X | 2X | 1X |

Table 1 shows modes that can be configured when an eye-opening monitor is used and modes that can be used without an eye-opening monitor. The table shows the combination of clock signals that are used for each mode in data and auxiliary circuits. The clock signals include in-phase and quadrature receive (I/Q) clock signals and auxiliary (A) clock signals. Table 1 also indicates the relative power consumption associated with each mode. The table comes power consumed by a phase interpolation circuit that produces multiphase receive signals, the current summer and the slicer. In some modes, quadrature signals are not used and parts of the phase interpolator may be disabled or idled.

Figure 11:
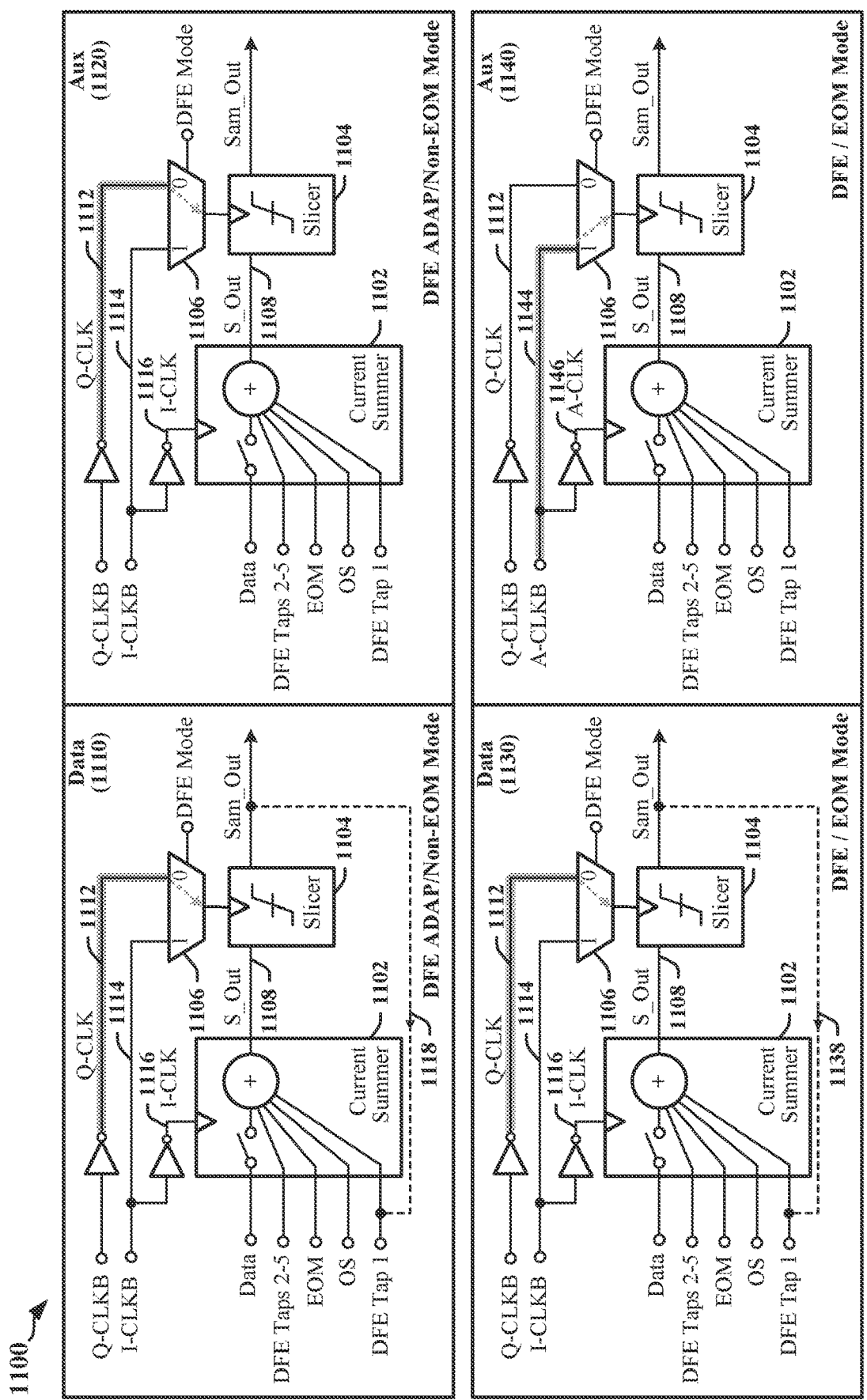
FIGS. 11-14 illustrate modes of operation for a decision-feedback equalizer configured in accordance with certain aspects of this disclosure.

FIGS. 11-14 illustrate certain aspects of the modes described in Table 1. FIG. 11 includes drawings that illustrate DFE ADAP/non-EOM modes 1100 for the data path 1110 and the auxiliary path 1120 in accordance with certain aspects of this disclosure. For both paths 1110, 1120, a multiplexer 1106 is configured to select between a first signal 1114 that is an inverted in-phase version of the receive clock and a second signal 1112 that is an inverted quadrature version of the receive clock obtained from a first inverter that is coupled to the version of quadrature receive clock. The multiplexer is operated or configured to select the second signal 1112 to drive the clock input of the slicer 1104. The current summer 1102 is clocked by a third signal 1116 that is an inverted version of the first signal 1114 that is obtained from a second inverter that is coupled to the first signal 1114. For the data path 1110, the output of the slicer 1104 is provided in a feedback signal 1118 coupled to the first DFE tap input to the current summer 1102.

FIG. 11 further includes drawings that illustrate DFE/EOM modes for the data path 1130 and the auxiliary path 1140 in accordance with certain aspects of this disclosure. For the data path 1130, a multiplexer 1106 is configured to select between a first signal 1114 that is an inverted in-phase version of the receive clock and a second signal 1112 that is an inverted quadrature version of the receive clock obtained from a first inverter that is coupled to the version of quadrature receive clock. The multiplexer is operated or configured to select the second signal 1112 to drive the clock input of the slicer 1104. The current summer 1102 is clocked by a third signal 1116 that is an inverted in version of the first signal 1114 obtained from a second inverter that is coupled to the first signal 1114. The output of the slicer 1104 is provided in a feedback signal 1138 coupled to the first DFE tap input to the current summer 1102. For the auxiliary path 1140, a multiplexer 1106 is configured to select between a fourth signal (A-CLKB 1144) that is an inverted in-phase version of the auxiliary clock and a second signal 1112 that is an inverted quadrature version of the receive clock obtained from a first inverter that is coupled to the version of quadrature receive clock. The multiplexer is operated or configured to select the first signal 1114 to drive the clock input of the slicer 1104. The current summer 1102 is clocked by a fifth signal (the auxiliary clock A-CLK 1146) that is an inverted version of A-CLKB 1144 obtained from a third inverter that is coupled to the A-CLKB 1144.

Figure 12:
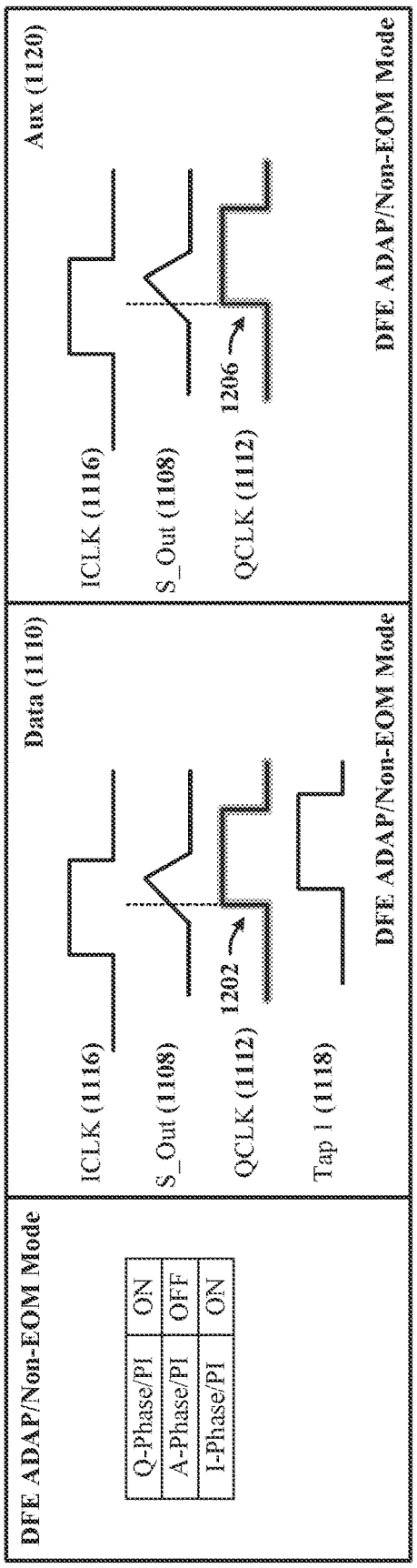
Figure 12:
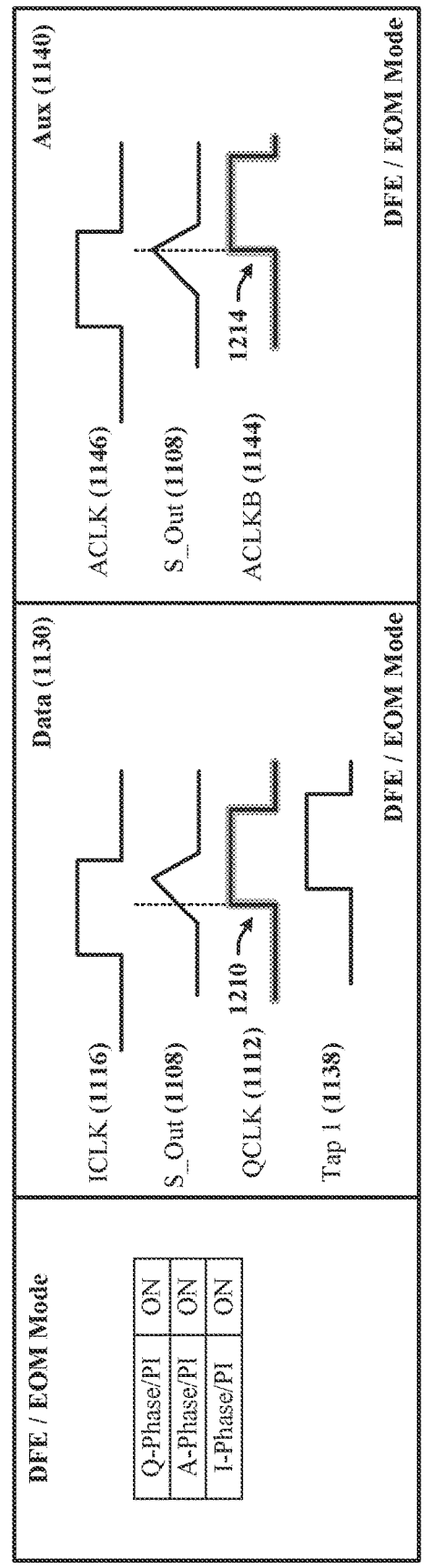

FIG. 12 includes a timing diagram 1200 that illustrates certain aspects of the DFE ADAP/non-EOM modes and a timing diagram 1220 that illustrates certain aspects of the DFE ADAP mode/non-EOM modes and DFE forced mode/EOM mode. In these examples, an edge 1202, 1206, 1210 or 1214 in the corresponding signal 1112 or 1144 is used to sample a summer output 1108. The data and auxiliary paths for DFE ADAP mode/non-EOM mode and the data path for the DFE forced mode/EOM mode can obtain increased time for the slicer 1104 to produce its output than the time available for the slicer 1104 in the auxiliary path for the DFE forced mode/EOM modes. Increased horizontal eye width can be obtained using a combination of in-phase and quadrature clock signals in the DFE ADAP mode/non-EOM mode and the data path for the DFE forced mode/EOM mode. A-CLK 1146 and A-CLKB 1144 may be used in the auxiliary path during EOM mode to measure the horizontal eye width by sweeping the phase of A-CLKB 1144 from 0 to 360 degrees.

Figure 13:
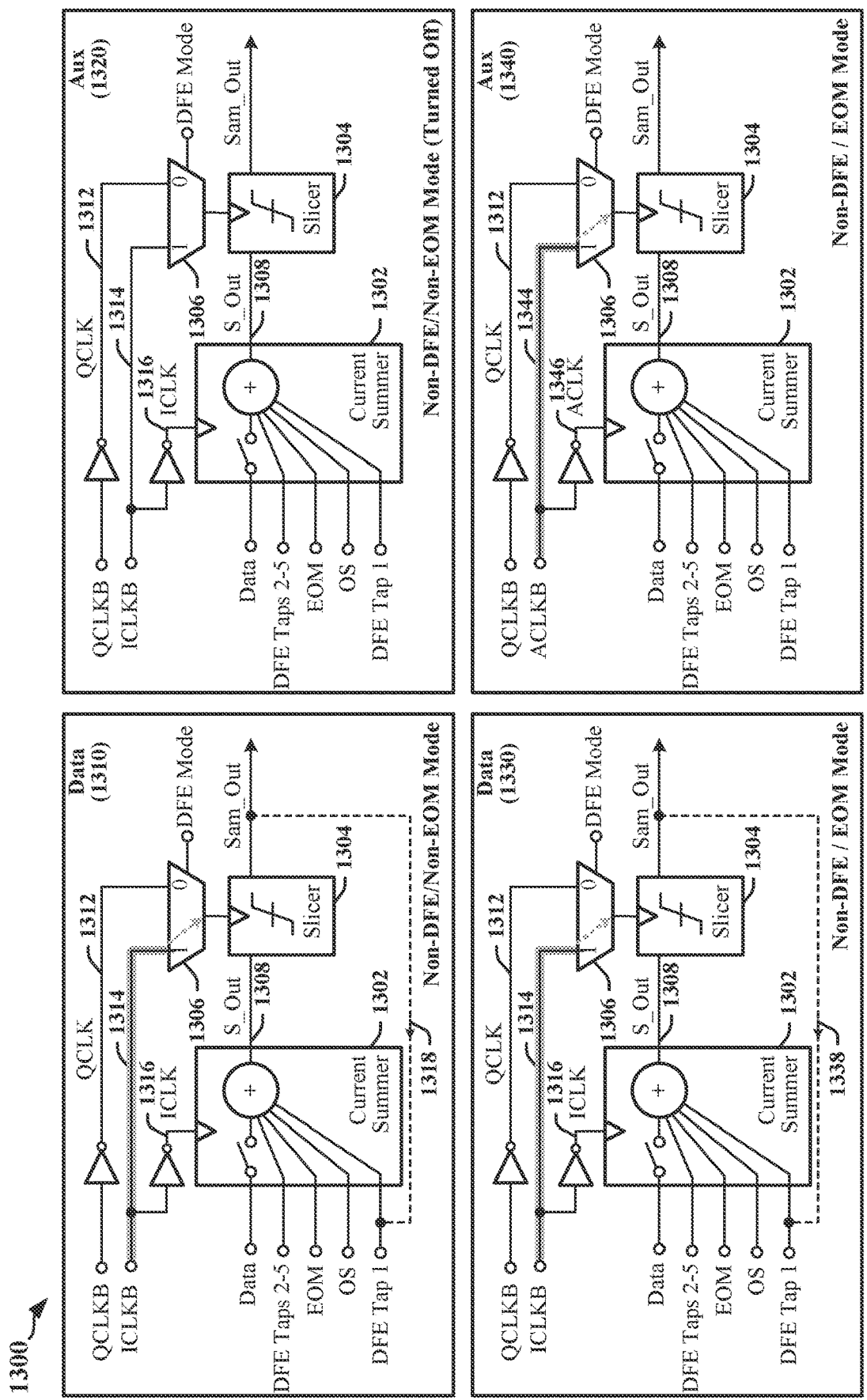

FIG. 13 includes is a drawing 1300 that illustrates non-DFE/non-EOM mode for the data path 1310 in accordance with certain aspects of this disclosure. The auxiliary path 1320 is turned off or disabled in non-DFE/non-EOM modes. For the data path 1310, a multiplexer 1306 is configured to select between a first signal 1314 that is an inverted in-phase version of the receive clock and a second signal 1312 that is an inverted quadrature version of the receive clock obtained from a first inverter that is coupled to the version of quadrature receive clock. The multiplexer is operated or configured to select the first signal 1314 to drive the clock input of the slicer 1304. The current summer 1302 is clocked by a third signal 1316 that is an inverted version of the first signal 1314 obtained from a second inverter that is coupled to the first signal 1314. The output 1318 of the slicer 1304 is provided as the first DFE tap input to the current summer 1302.

FIG. 13 further includes drawings that illustrate Non-DFE/EOM mode for the data path 1330 and the auxiliary path 1340 in accordance with certain aspects of this disclosure. For the data path 1330, a multiplexer 1106 is configured to select between a first signal 1314 that is an inverted in-phase version of the receive clock and a second signal 1312 that is an inverted quadrature version of the receive clock obtained from a first inverter that is coupled to the version of quadrature receive clock. The multiplexer is operated or configured to select the first signal 1314 to drive the clock input of the slicer 1304. The current summer 1302 is clocked by a third signal 1316 that is an inverted in version of the first signal 1314 obtained from a second inverter that is coupled to the first signal 1314. The output 1338 of the slicer 1304 is provided as the first DFE tap input to the current summer 1302. For the auxiliary path 1340, a multiplexer 1306 is configured to select between a fourth signal 1344 that is an inverted in-phase version of the auxiliary clock and a second signal 1312 that is an inverted quadrature version of the receive clock obtained from a first inverter that is coupled to the version of quadrature receive clock. The multiplexer is operated or configured to select the first signal 1314 to drive the clock input of the slicer 1304. The current summer 1302 is clocked by a fifth signal 1346 that is an inverted version of the fourth signal 1344 obtained from a third inverter that is coupled to the fourth signal 1344.

Figure 14:
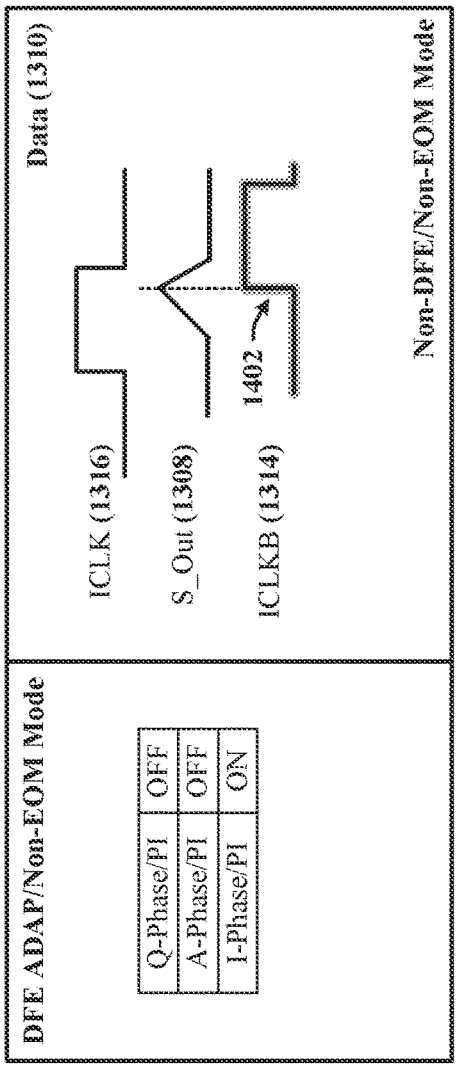
Figure 14:
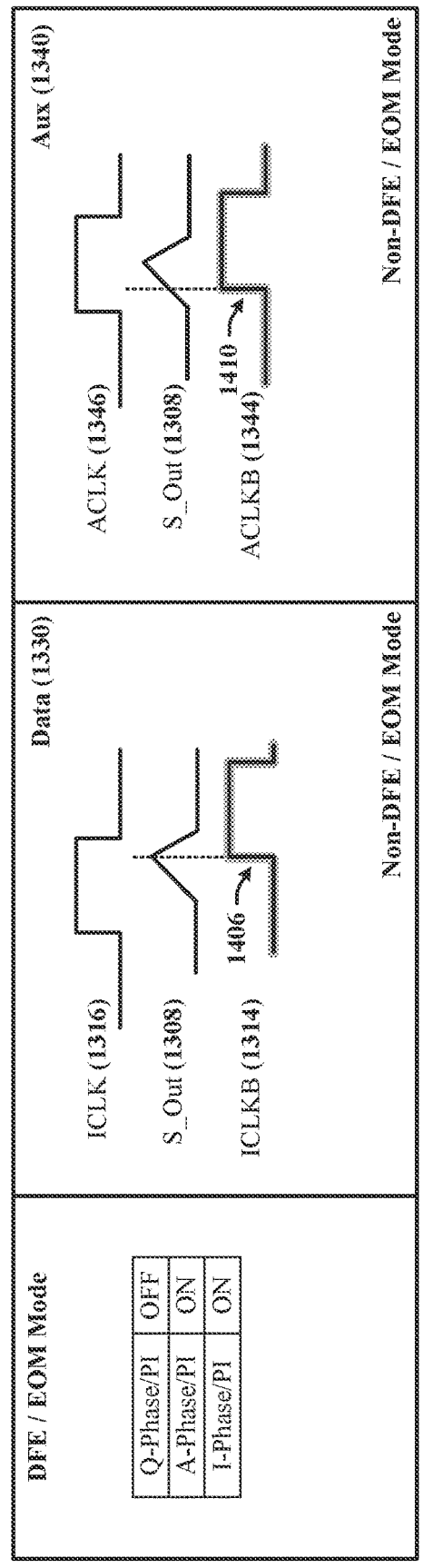

FIG. 14 includes a timing diagram 1400 that illustrates certain aspects of the non-DFE/non-EOM mode and a timing diagram 1420 that illustrates certain aspects of the Non-DFE/EOM mode. In these examples, an edge 1402, 1406 or 1410 in the corresponding signal 1314 or 1344 is used to sample a summer output 1308. The auxiliary path for the Non-DFE/EOM mode obtains increased time for the slicer 1104 to produce its output than the time available for the slicer 1104 in the data paths for non-DFE/non-EOM and Non-DFE/EOM modes. This difference is attributable to the use of an auxiliary clock that is phase shifted with respect to the in-phase receive clock rather than the in-phase receive clock signal and the inverted in-phase clock signal used by the data paths for non-DFE/non-EOM and Non-DFE/EOM modes.

According to certain aspects of this disclosure, an equalizing circuit has a first current summer configured to receive a data signal and a first plurality of feedback signals, a first multiplexer configured to select a first sampling clock signal from a plurality of clock signals using a signal that indicates a mode of operation of the equalizing circuit, and a first slicer configured to sample the output of the first current summer in accordance with timing provided by the first sampling clock signal.

In some instances, the plurality of clock signals may include one or more phase versions of a receive clock signal. At least one of the one or more phase versions of the receive clock signal may be inverted. The plurality of clock signals may include quadrature and in-phase versions of the receive clock signal. The plurality of clock signals may include the receive clock signal and an auxiliary clock signal that has a preconfigured phase shift with respect to the receive clock signal.

In some instances, the first plurality of feedback signals includes a signal generated using an output of the first slicer. The first plurality of feedback signals may include a signal generated by an eye opening monitor. The first plurality of feedback signals may include an offset signal configured to calibrate the equalizing circuit.

In some implementations, the equalizing circuit has a second current summer configured to receive the data signal and a second plurality of feedback signals, a second multiplexer configured to select a second sampling clock signal from the plurality of clock signals using the signal that indicates the mode of operation of the equalizing circuit, and a second slicer configured to sample the output of the second current summer in accordance with timing provided by the second sampling clock signal. Each of a plurality of clock inputs of the second multiplexer is coupled to a signal that is an inverse of a clock signal coupled to a corresponding clock input of the first multiplexer such that the second sampling clock signal is inverted with respect to the first sampling clock signal. In some instances, the first plurality of feedback signals includes a signal generated using an output of the second slicer and the second plurality of feedback signals includes a signal generated using an output of the first slicer.

Figure 15:
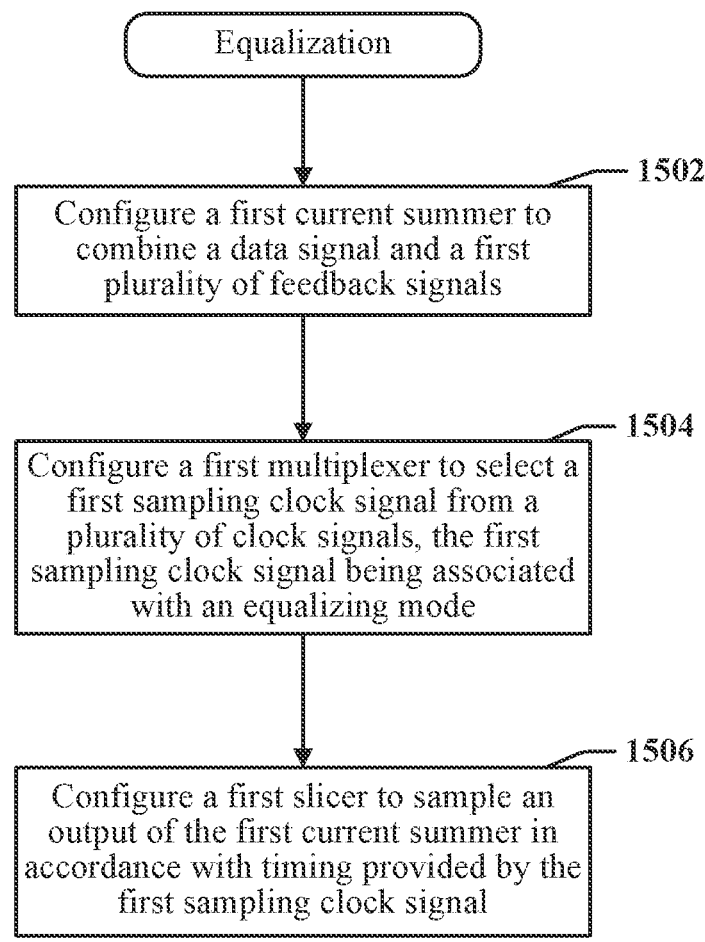
FIG. 15 is a flow diagram illustrating an example of a method for equalizing a data signal received from a serial data link in accordance with certain aspects disclosed herein.

FIG. 15 is a flow diagram illustrating an example of a method 1500 for equalizing a data signal received from a serial data link in accordance with certain aspects disclosed herein. The method 1500 may be implemented in a receiver coupled to the serial data link. At block 1502, a first current summer may be configured to combine the data signal and a first plurality of feedback signals. At block 1504 a first multiplexer may be configured to select a first sampling clock signal from a plurality of clock signals, the first sampling clock signal being associated with an equalizing mode. At block 1506, a first slicer may be configured to sample the output of the first current summer in accordance with timing provided by the first sampling clock signal.

In certain examples, the plurality of clock signals may include one or more phase versions of a receive clock signal. At least one of the one or more phase versions of the receive clock signal may be inverted. The plurality of clock signals may include quadrature and in-phase versions of the receive clock signal. The plurality of clock signals may include the receive clock signal and an auxiliary clock signal that has a preconfigured phase shift with respect to the receive clock signal.

In certain examples, the first plurality of feedback signals includes a signal generated using an output of the first slicer. The first plurality of feedback signals may include a signal generated by an eye opening monitor. The first plurality of feedback signals may include an offset signal configured to calibrate the equalizing circuit.

In some implementations, the method includes configuring a second current summer to receive the data signal and a second plurality of feedback signals, configuring a second multiplexer to select a second sampling clock signal from the plurality of clock signals, the second sampling clock signal being associated with an equalizing mode, and configuring a second slicer to sample the output of the second current summer in accordance with timing provided by the second sampling clock signal. Each of a plurality of clock inputs of the second multiplexer is coupled to a signal that is an inverse of a clock signal coupled to a corresponding clock input of the first multiplexer such that the second sampling clock signal is inverted with respect to the first sampling clock signal. In one example, the first plurality of feedback signals includes a signal generated using an output of the second slicer and the second plurality of feedback signals includes a signal generated using an output of the first slicer.

The operational steps described in any of the exemplary aspects herein are described to provide examples. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering. In certain aspects, an apparatus includes means for combining a data signal with feedback signals, including a first current summer and a first plurality of feedback signals, means for selecting sampling signals, including a first multiplexer configured to select a first sampling clock signal from a plurality of clock signals using a signal that indicates a mode of operation of the equalizing circuit, and means for sampling the data signal including a first slicer configured to sample the output of the first current summer in accordance with timing provided by the first sampling clock signal.

In certain examples, the plurality of clock signals may include one or more phase versions of a receive clock signal. At least one of the one or more phase versions of the receive clock signal may be inverted. The plurality of clock signals may include quadrature and in-phase versions of the receive clock signal. The plurality of clock signals may include the receive clock signal and an auxiliary clock signal that has a preconfigured phase shift with respect to the receive clock signal.

In certain examples, the first plurality of feedback signals includes a signal generated using an output of the first slicer. The first plurality of feedback signals may include a signal generated by an eye opening monitor. The first plurality of feedback signals may include an offset signal configured to calibrate the equalizing circuit.

In some implementations, the means for combining the data signal with the feedback signals includes a second current summer configured to receive the data signal and a second plurality of feedback signals, the means for selecting sampling signals includes a second multiplexer configured to select a second sampling clock signal from the plurality of clock signals using the signal that indicates the mode of operation of the equalizing circuit, and the means for sampling the data signal includes a second slicer configured to sample the output of the second current summer in accordance with timing provided by the second sampling clock signal. Each of a plurality of clock inputs of the second multiplexer is coupled to a signal that is an inverse of a clock signal coupled to a corresponding clock input of the first multiplexer such that the second sampling clock signal is inverted with respect to the first sampling clock signal. In one example, the first plurality of feedback signals includes a signal generated using an output of the second slicer and the second plurality of feedback signals includes a signal generated using an output of the first slicer.

Some implementation examples are described in the following numbered clauses:

1. An equalizing circuit comprising: a first current summer configured to receive a data signal and a first plurality of feedback signals; a first multiplexer configured to select a first sampling clock signal from a plurality of clock signals using a signal that indicates a mode of operation of the equalizing circuit; and a first slicer configured to sample an output of the first current summer in accordance with timing provided by the first sampling clock signal.
2. The clock generation circuit as described in clause 1, wherein the plurality of clock signals comprises one or more phase versions of a receive clock signal.
3. The clock generation circuit as described in clause 2, wherein the one or more phase versions of the receive clock signal includes an inverted version of the receive clock signal.
4. The clock generation circuit as described in any of clauses 1-3, wherein the plurality of clock signals comprises quadrature and in-phase versions of a receive clock signal.
5. The clock generation circuit as described in any of clauses 1-4, wherein the plurality of clock signals comprises a receive clock signal and an auxiliary clock signal that has a preconfigured phase shift with respect to the receive clock signal.

6. The clock generation circuit as described in any of clauses 1-5, wherein the first plurality of feedback signals includes a signal generated by an eye opening monitor.
7. The clock generation circuit as described in any of clauses 1-6, wherein the first plurality of feedback signals includes an offset signal configured to calibrate the equalizing circuit.
8. The clock generation circuit as described in any of clauses 1-7, further comprising: a second current summer configured to receive the data signal and a second plurality of feedback signals; a second multiplexer configured to select a second sampling clock signal from the plurality of clock signals using the signal that indicates the mode of operation of the equalizing circuit; and a second slicer configured to sample the output of the second current summer in accordance with timing provided by the second sampling clock signal, wherein each of a plurality of clock inputs of the second multiplexer is coupled to a signal that is an inverse of a clock signal coupled to a corresponding clock input of the first multiplexer such that the second sampling clock signal is inverted with respect to the first sampling clock signal.
9. The clock generation circuit as described in clause 8, wherein the first plurality of feedback signals includes a signal generated using an output of the second slicer.
10. The clock generation circuit as described in clause 8 or clause 9, wherein the second plurality of feedback signals includes a signal generated using an output of the first slicer.
11. An apparatus, comprising: means for combining a data signal with feedback signals, including a first current summer and a first plurality of feedback signals; means for selecting sampling signals, including a first multiplexer configured to select a first sampling clock signal from a plurality of clock signals using a signal that indicates a mode of operation of the equalizing circuit; and means for sampling the data signal including a first slicer configured to sample an output of the first current summer in accordance with timing provided by the first sampling clock signal.
12. The apparatus as described in clause 11, wherein the plurality of clock signals comprises one or more phase versions of a receive clock signal.
13. The apparatus as described in clause 12, wherein the one or more phase versions of the receive clock signal includes an inverted version of the receive clock signal.
14. The apparatus as described in any of clauses 11-13, wherein the plurality of clock signals comprises quadrature and in-phase versions of a receive clock signal.
15. The apparatus as described in any of clauses 11-14, wherein the plurality of clock signals comprises a receive clock signal and an auxiliary clock signal that has a preconfigured phase shift with respect to the receive clock signal.
16. The apparatus as described in any of clauses 11-15, wherein the first plurality of feedback signals includes a signal generated by an eye opening monitor.
17. The apparatus as described in any of clauses 11-16, wherein the first plurality of feedback signals includes an offset signal configured to calibrate the equalizing circuit.
18. The apparatus as described in any of clauses 11-17, wherein the means for combining the data signal with the feedback signals includes a second current summer configured to receive the data signal and a second plurality of feedback signals, wherein the means for selecting sampling signals includes a second multiplexer configured to select a second sampling clock signal from the plurality of clock signals using the signal that indicates the mode of operation of the equalizing circuit, wherein the means for sampling the data signal includes a second slicer configured to sample the output of the second current summer in accordance with timing provided by the second sampling clock signal and, wherein each of a plurality of clock inputs of the second multiplexer is coupled to a signal that is an inverse of a clock signal coupled to a corresponding clock input of the first multiplexer such that the second sampling clock signal is inverted with respect to the first sampling clock signal.
19. The apparatus as described in clause 18, wherein the first plurality of feedback signals includes a signal generated using an output of the second slicer.
20. The apparatus as described in clause 18 or clause 19, wherein the second plurality of feedback signals includes a signal generated using an output of the first slicer.
21. A method for equalizing a data signal received from a serial data link, comprising: configuring first current summer to combine the data signal and a first plurality of feedback signals; configuring a first multiplexer to select a first sampling clock signal from a plurality of clock signals, the first sampling clock signal being associated with an equalizing mode; and configuring a first slicer to sample an output of the first current summer in accordance with timing provided by the first sampling clock signal.
22. The method as described in clause 21, wherein the plurality of clock signals comprises one or more phase versions of a receive clock signal.
23. The method as described in clause 22, wherein the one or more phase versions of the receive clock signal includes an inverted version of the receive clock signal.
24. The method as described in any of clauses 21-23, wherein the plurality of clock signals comprises quadrature and in-phase versions of a receive clock signal.
25. The method as described in any of clauses 21-24, wherein the plurality of clock signals comprises a receive clock signal and an auxiliary clock signal that has a preconfigured phase shift with respect to the receive clock signal.
26. The method as described in any of clauses 21-25, wherein the first plurality of feedback signals includes a signal generated by an eye opening monitor.
27. The method as described in any of clauses 21-26, wherein the first plurality of feedback signals includes an offset signal configured to calibrate the equalizing circuit.
28. The method as described in any of clauses 21-27, further comprising: configuring a second current summer to receive the data signal and a second plurality of feedback signals; configuring a second multiplexer to select a second sampling clock signal from the plurality of clock signals, the second sampling clock signal being associated with an equalizing mode; and configuring a second slicer to sample the output of the second current summer in accordance with timing provided by the second sampling clock signal, wherein each of a plurality of clock inputs of the second multiplexer is coupled to a signal that is an inverse of a clock signal coupled to a corresponding clock input of the first multiplexer such that the second sampling clock signal is inverted with respect to the first sampling clock signal.

29. The method as described in clause 28, wherein the first plurality of feedback signals includes a signal generated using an output of the second slicer.

30. The method as described in clause 28 or clause 29, wherein the second plurality of feedback signals includes a signal generated using an output of the first slicer.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The present disclosure is provided to enable any person skilled in the art to make or use aspects of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An equalizing circuit comprising:
   a first current summer configured to receive a data signal and a first plurality of feedback signals;
   a first multiplexer configured to select a first sampling clock signal from a plurality of clock signals using a signal that indicates a mode of operation of the equalizing circuit; and
   a first slicer configured to sample an output of the first current summer in accordance with timing provided by the first sampling clock signal, wherein the plurality of clock signals comprises a receive clock signal and an auxiliary clock signal, and wherein the auxiliary clock signal has a preconfigured phase shift with respect to the receive clock signal.

2. The equalizing circuit of claim 1, wherein the plurality of clock signals comprises one or more phase versions of a receive clock signal.

3. The equalizing circuit of claim 2, wherein the one or more phase versions of the receive clock signal includes an inverted version of the receive clock signal.

4. The equalizing circuit of claim 1, wherein the plurality of clock signals comprises quadrature and in-phase versions of a receive clock signal.

5. The equalizing circuit of claim 1, wherein the first plurality of feedback signals includes a signal generated by an eye opening monitor.

6. The equalizing circuit of claim 1, wherein the first plurality of feedback signals includes an offset signal configured to calibrate the equalizing circuit.

7. The equalizing circuit of claim 1, further comprising:
   a second current summer configured to receive the data signal and a second plurality of feedback signals;
   a second multiplexer configured to select a second sampling clock signal from the plurality of clock signals using the signal that indicates the mode of operation of the equalizing circuit; and
   a second slicer configured to sample an output of the second current summer in accordance with timing provided by the second sampling clock signal,
   wherein each of a plurality of clock inputs of the second multiplexer is coupled to a signal that is an inverse of a clock signal coupled to a corresponding clock input of the first multiplexer such that the second sampling clock signal is inverted with respect to the first sampling clock signal.

8. The equalizing circuit of claim 7, wherein the first plurality of feedback signals includes a signal generated using an output of the second slicer.

9. The equalizing circuit of claim 7, wherein the second plurality of feedback signals includes a signal generated using an output of the first slicer.

10. An apparatus, comprising:
    means for combining a data signal with feedback signals, including a first current summer and a first plurality of feedback signals;
    means for selecting sampling signals, including a first multiplexer configured to select a first sampling clock signal from a plurality of clock signals using a signal that indicates a mode of operation of the apparatus; and
    means for sampling the data signal including a first slicer configured to sample an output of the first current summer in accordance with timing provided by the first sampling clock signal, wherein the plurality of clock signals comprises a receive clock signal and an auxiliary clock signal that has a preconfigured phase shift with respect to the receive clock signal.

11. The apparatus of claim 10, wherein the plurality of clock signals comprises one or more phase versions of a receive clock signal.

12. The apparatus of claim 11, wherein the one or more phase versions of the receive clock signal includes an inverted version of the receive clock signal.

13. The apparatus of claim 10, wherein the plurality of clock signals comprises quadrature and in-phase versions of a receive clock signal.

14. The apparatus of claim 10, wherein the first plurality of feedback signals includes a signal generated by an eye opening monitor.

15. The apparatus of claim 10, wherein the first plurality of feedback signals includes an offset signal configured to calibrate the apparatus.

16. The apparatus of claim 10, wherein the means for combining the data signal with the feedback signals includes a second current summer configured to receive the data signal and a second plurality of feedback signals,
    wherein the means for selecting sampling signals includes a second multiplexer configured to select a second sampling clock signal from the plurality of clock signals using the signal that indicates the mode of operation of the apparatus,
    wherein the means for sampling the data signal includes a second slicer configured to sample an output of the second current summer in accordance with timing provided by the second sampling clock signal and
    wherein each of a plurality of clock inputs of the second multiplexer is coupled to a signal that is an inverse of a clock signal coupled to a corresponding clock input of the first multiplexer such that the second sampling clock signal is inverted with respect to the first sampling clock signal.

17. The apparatus of claim 16, wherein the first plurality of feedback signals includes a signal generated using an output of the second slicer.

18. The apparatus of claim 16, wherein the second plurality of feedback signals includes a signal generated using an output of the first slicer.

19. A method for equalizing a data signal received from a serial data link, comprising:
 configuring a first current summer to combine a data signal and a first plurality of feedback signals;
 configuring a first multiplexer to select a first sampling clock signal from a plurality of clock signals, the first sampling clock signal being associated with an equalizing mode; and
 configuring a first slicer to sample an output of the first current summer in accordance with timing provided by the first sampling clock signal, wherein the plurality of clock signals comprises a receive clock signal and an auxiliary clock signal that has a preconfigured phase shift with respect to the receive clock signal.

20. The method of claim 19, wherein the plurality of clock signals comprises one or more phase versions of a receive clock signal.

21. The method of claim 20, wherein the one or more phase versions of the receive clock signal includes an inverted version of the receive clock signal.

22. The method of claim 19, wherein the plurality of clock signals comprises quadrature and in-phase versions of a receive clock signal.

23. The method of claim 19, wherein the first plurality of feedback signals includes a signal generated by an eye opening monitor.

24. The method of claim 19, wherein the first plurality of feedback signals includes an offset signal configured by calibration.

25. The method of claim 19, further comprising:
 configuring a second current summer to receive the data signal and a second plurality of feedback signals;
 configuring a second multiplexer to select a second sampling clock signal from the plurality of clock signals, the second sampling clock signal being associated with an equalizing mode; and
 configuring a second slicer to sample an output of the second current summer in accordance with timing provided by the second sampling clock signal,
 wherein each of a plurality of clock inputs of the second multiplexer is coupled to a signal that is an inverse of a clock signal coupled to a corresponding clock input of the first multiplexer such that the second sampling clock signal is inverted with respect to the first sampling clock signal.

26. The method of claim 25, wherein the first plurality of feedback signals includes a signal generated using an output of the second slicer.

27. The method of claim 25, wherein the second plurality of feedback signals includes a signal generated using an output of the first slicer.

* * * * *